US008705468B2

(12) United States Patent
Montojo et al.

(10) Patent No.: US 8,705,468 B2
(45) Date of Patent: Apr. 22, 2014

(54) SYSTEM, APPARATUS AND METHOD FOR DOWNLINK AND UPLINK GRANT DESIGN IN WIRELESS COMMUNICATION SYSTEMS

(75) Inventors: Juan Montojo, San Diego, CA (US); Wanshi Chen, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 13/099,655

(22) Filed: May 3, 2011

(65) Prior Publication Data

US 2012/0120924 A1 May 17, 2012

Related U.S. Application Data

(60) Provisional application No. 61/330,845, filed on May 3, 2010.

(51) Int. Cl.
*H04W 72/14* (2009.01)
(52) U.S. Cl.
CPC ................................. *H04W 72/14* (2013.01)
USPC .......................................... 370/329; 370/468
(58) Field of Classification Search
USPC ................... 370/328–338, 431–463
See application file for complete search history.

(56) References Cited

U.S. PATENT DOCUMENTS

| 2009/0207853 | A1* | 8/2009 | Mueller-Weinfurtner et al. ............... 370/465 |
| 2010/0120424 | A1* | 5/2010 | Johansson et al. ........ 455/435.1 |
| 2011/0211551 | A1* | 9/2011 | Parkvall ...................... 370/330 |

FOREIGN PATENT DOCUMENTS

| WO | 2007148946 A2 | 12/2007 |
| WO | 2009082332 A1 | 7/2009 |

OTHER PUBLICATIONS

International Search Report and Written Opinion—PCT/US2011/035059—ISA/EPO—Sep. 29, 2011.
Motorola: "Optimization of Resource Assignment for Uplink Backhaul", 3GPP Draft; R1-092169, 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050339606, [retrieved on Apr. 28, 2009].
Panasonic: "R-PDCCH interleaving details", Aug. 17, 2010, 3GPP Draft; R1-104908, 3rd Generation Partnership Project (3GPP), Mobile Competence Centre ; 650, Route Des Lucioles ; F-06921 Sophia-Antipolis Cedex ; France, XP050450055, [retrieved on Aug. 17, 2010].

* cited by examiner

*Primary Examiner* — Pao Sinkantarakorn
(74) *Attorney, Agent, or Firm* — Michael J. DeHaemer, Jr.

(57) ABSTRACT

In accordance with aspects of the disclosure, a method, apparatus, and computer program product are provided for wireless communication. The method, apparatus, and computer program product may be configured to provide at least one control channel for downlink grant information, provide at least one other control channel for uplink grant information, and adjust time apportioned for the downlink and uplink grant information in the control channels.

80 Claims, 16 Drawing Sheets

SYSTEM, APPARATUS AND METHOD FOR DOWNLINK AND UPLINK GRANT DESIGN IN WIRELESS COMMUNICATION SYSTEMS

CROSS-REFERENCE TO RELATED APPLICATION(S)

This application claims the benefit of U.S. Provisional Application Ser. No. 61/330,845, entitled "Method and Apparatus for Uplink and Downlink Grant Design in a Wireless Communication System," filed on May 3, 2010, which is expressly incorporated by reference herein in its entirety.

BACKGROUND

1. Field

The present disclosure relates generally to communication systems, and more particularly, to downlink and uplink grant design in wireless communication systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, these multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with an aspect of the disclosure, a method to facilitate wireless communication comprises providing at least one control channel for downlink grant information, providing at least one other control channel for uplink grant information, and adjusting time apportioned for the downlink and uplink grant information in the control channels.

In accordance with an aspect of the disclosure, an apparatus to facilitate wireless communication comprises a processing system configured to provide at least one control channel for downlink grant information, provide at least one other control channel for uplink grant information, and adjust time apportioned for the downlink and uplink grant information in the control channels.

In accordance with an aspect of the disclosure, an apparatus to facilitate wireless communication comprises a means for providing at least one control channel for downlink grant information, a means for providing at least one other control channel for uplink grant information, and a means for adjusting time apportioned for the downlink and uplink grant information in the control channels.

In accordance with an aspect of the disclosure, a computer program product comprises a computer-readable medium comprising codes executable to cause an apparatus to provide at least one control channel for downlink grant information, provide at least one other control channel for uplink grant information, and adjust time apportioned for the downlink and uplink grant information in the control channels.

In accordance with an aspect of the disclosure, a method to facilitate wireless communication comprises determining time apportioned for downlink grant information in at least one control channel, determining time apportioned for uplink grant information in at least one other control channel, and receiving downlink and uplink grant information in the control channels.

In accordance with an aspect of the disclosure, an apparatus to facilitate wireless communication comprises a processing system configured to determine time apportioned for downlink grant information in at least one control channel, determine time apportioned for uplink grant information in at least one other control channel, and receive downlink and uplink grant information in the control channels.

In accordance with an aspect of the disclosure, an apparatus to facilitate wireless communication comprises a means for determining time apportioned for downlink grant information in at least one control channel, a means for determining time apportioned for uplink grant information in at least one other control channel, and a means for receiving downlink and uplink grant information in the control channels.

In accordance with an aspect of the disclosure, a computer program product comprises a computer-readable medium comprising codes executable to cause an apparatus to determine time apportioned for downlink grant information in at least one control channel, determine time apportioned for uplink grant information in at least one other control channel, and receive downlink and uplink grant information in the control channels.

BRIEF DESCRIPTION OF THE DRAWINGS

The features, nature, and advantages of the disclosure will become more apparent from the detailed description set forth below when taken in conjunction with the drawings in which like reference characters identify correspondingly throughout.

DETAILED DESCRIPTION

Figure 1:
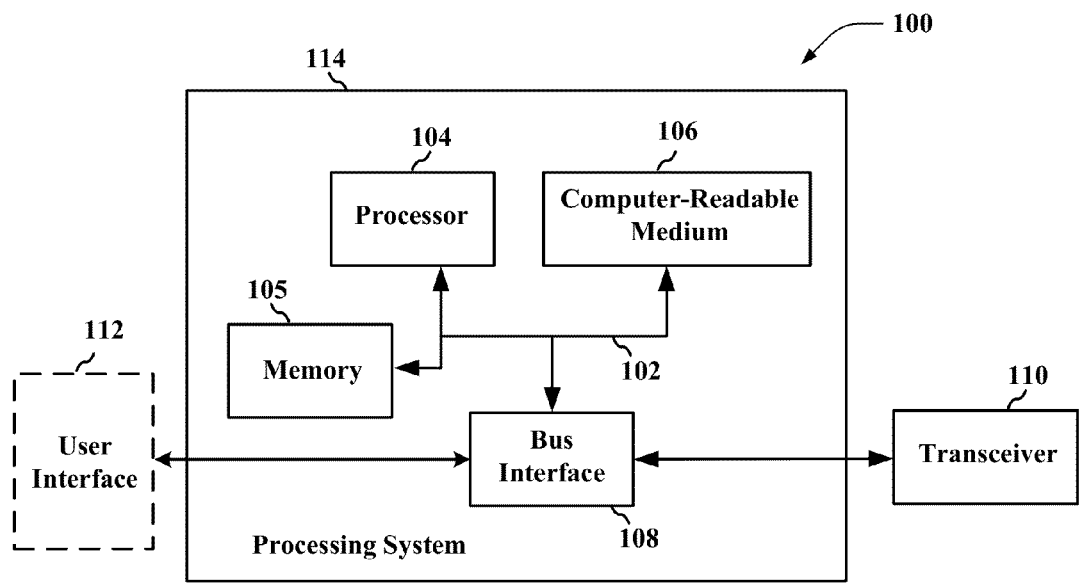
FIG. 1 is a diagram illustrating an example of a hardware implementation for an apparatus employing a processing system, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

FIG. 1 is a conceptual diagram illustrating an example of an implementation for an apparatus 100 employing a processing system 114 and a memory 105, in accordance with aspects of the disclosure. In one example, the processing system 114 may be implemented with a bus architecture, represented by a bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending on the nature of the apparatus 100, a user interface 112 (e.g., keypad, touchpad, monitor, display, speaker, microphone, joystick) may also be provided to interface with a user.

The processor 104 is configured for managing the bus 102 and general processing, including the execution of software stored on the computer-readable medium 106. The software, when executed by the processor 104, causes the processing system 114 to perform the various functions described herein for any particular apparatus. The computer-readable medium 106 may also be utilized for storing data that is manipulated by the processor 104 when executing software.

Figure 2:
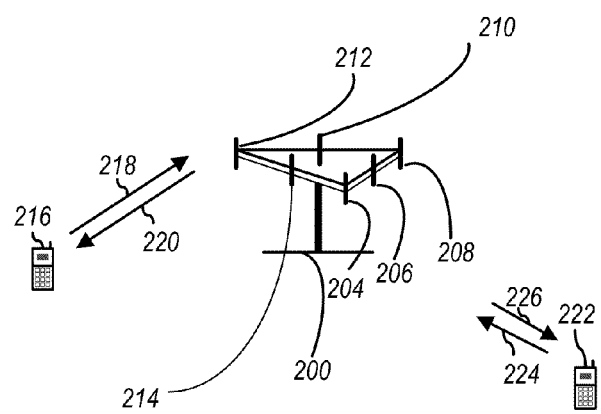
FIG. 2 illustrates a multiple access wireless communication system, in accordance with aspects of the disclosure.

FIG. 2 is a diagram illustrating an embodiment of a multiple access wireless communication system, in accordance with aspects of the disclosure. An access point 200 (AP) includes multiple antenna groups, for example, one including 204 and 206, another including 208 and 210, and an additional including 212 and 214. In FIG. 2, only two antennas are shown for each antenna group; however, more or fewer antennas may be utilized for each antenna group. Access terminal 216 (AT) is in communication with antennas 212 and 214, where antennas 212 and 214 transmit information to access terminal 216 over forward link or downlink (DL) 220 and receive information from access terminal 216 over reverse link or uplink (UL) 218. Access terminal 222 is in communication with antennas 206 and 208, where antennas 206 and 208 transmit information to access terminal 222 over forward link or downlink (DL) 226 and receive information from access terminal 222 over reverse link or uplink (UL) 224.

In an aspect of the disclosure, in a frequency division duplexing (FDD) system, communication links 218, 220, 224 and 226 may use different frequency for communication. For example, forward link or downlink (DL) 220 may use a different frequency then that utilized by reverse link or uplink (UL) 218.

In an aspect of the disclosure, each group of antennas and/or the area in which they are designed to communicate may be referred to as a sector of the access point. In an example, each antenna group may be designed to communicate to access terminals in a sector of the areas covered by access point 200.

When communicating over forward links or downlinks (DLs) 220, 226, the transmitting antennas of access point 200 utilize beamforming to improve a signal-to-noise ratio of the forward links or downlinks 220, 226 for the different access terminals 216 and 224, respectively. Also, an access point utilizing beamforming to transmit to access terminals scattered randomly through its coverage causes less interference to access terminals in neighboring cells than an access point transmitting through a single antenna to all its access terminals.

An access point may be a fixed station utilized for communicating with the terminals and may also be referred to as an access point (AP), a Node B (NB), evolved Node B (eNB), or some other terminology. An access terminal may be referred to as an access terminal (AT), user equipment (UE), a wireless communication device, terminal, or some other terminology. Moreover, an access point may be a macrocell access point, femtocell access point, picocell access point, and/or the like.

In various embodiments, as described herein, one or more segments or one or more extension carriers may be linked to a regular carrier resulting in a composite bandwidth over which the UE may transmit information to, and/or receive information from, the eNB.

Figure 3A:
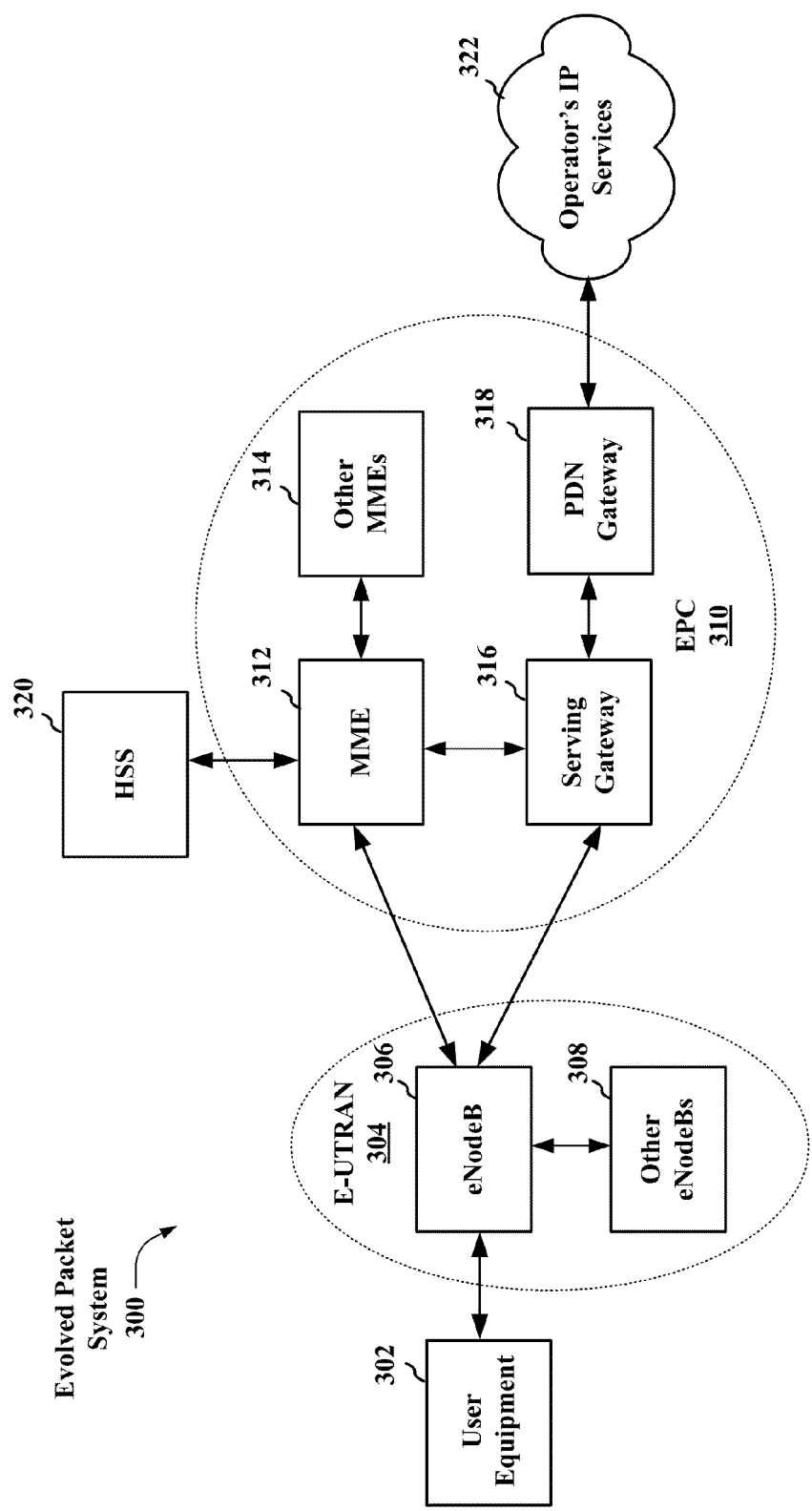
FIG. 3A is a diagram illustrating an example of a network architecture, in accordance with aspects of the disclosure.

FIG. 3A is a diagram illustrating an embodiment of a Long Term Evolution (LTE) network architecture 300, in accordance with aspects of the disclosure. The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS may interconnect with other access networks, but for simplicity, those entities/interfaces are not shown. As shown in FIG. 3A, the EPS 300 provides packet-switched services. However, as those skilled in the art will readily appreciate, the various concepts presented throughout this disclosure may be extended to networks providing circuit-switched services. Further, it should be appreciated that each of the apparatuses and/or devices in the EPS 300 may each comprise the apparatus 100 of FIG. 1, without departing from the scope of the disclosure.

The E-UTRAN includes the evolved Node B (eNB) 306 and/or one or more other eNBs 308. The eNB 306 provides user and control plane protocol terminations toward the UE 302. The eNB 306 may be connected to one or more other eNBs 308 via an X2 interface (i.e., backhaul). The eNB 306 may be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of the UE 302 include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, or any other similar functioning device. The UE 302 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. The MME 312 is configured to provide bearer and connection management. User IP packets are transferred through the Serving Gateway 316, which itself is connected to the PDN Gateway 318. The PDN Gateway 318 provides UE Internet Protocol (IP) address allocation and/or other functions. The PDN Gateway 318 is connected to the Operator's IP Services 322. The Operator's IP Services 322 may include the Internet, an intranet, an IP Multimedia Subsystem (IMS), and a PS Streaming Service (PSS).

Figure 3B:
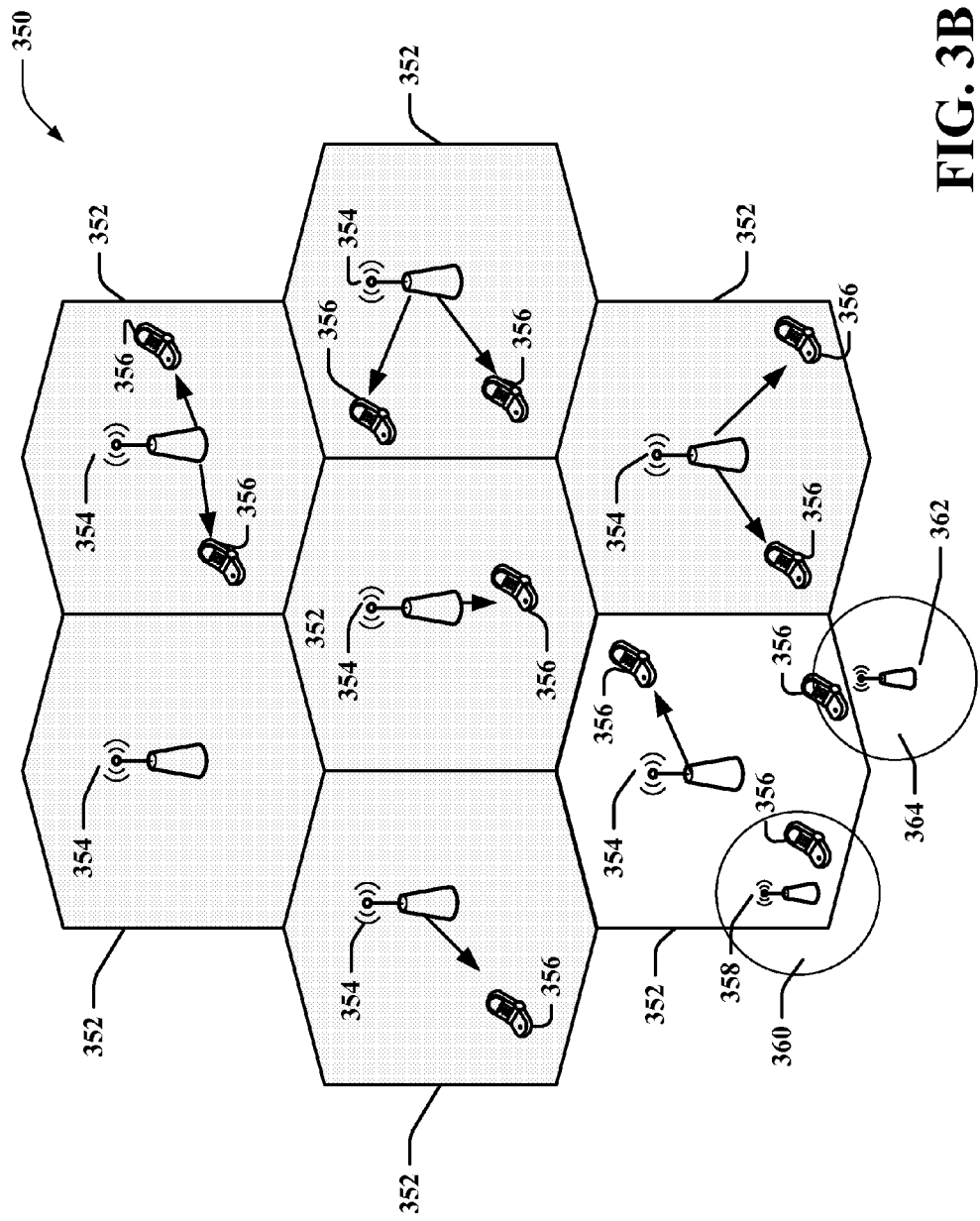
FIG. 3B is a diagram illustrating an example of an access network, in accordance with aspects of the disclosure.

FIG. 3B is a diagram illustrating an example of an access network in an LTE network architecture, in accordance with aspects of the disclosure. In an example, the access network 350 is divided into a number of cellular regions (cells) 352. One or more lower power class eNBs 358, 362 may have cellular regions 360, 364, respectively, that overlap with one or more of the cellular regions or cells 352. The lower power class eNBs 358, 362 may be femto cells (e.g., home eNBs (HeNBs)), pico cells, or micro cells. A higher power class or macro eNB 354 is assigned to a cell 352 and is configured to provide an access point to the EPC 310 for the UEs 356 in the cell 352. Even though there is no centralized controller in this example of the access network 350, a centralized controller may be utilized in alternative configurations. The eNB 354 is responsible for one or more radio related functions including radio bearer control, admission control, mobility control, scheduling, security, and connectivity to the serving gateway 316 (e.g., in FIG. 3A).

The modulation and multiple access scheme utilized by the access network 350 may vary depending on a particular telecommunications standard being deployed. In LTE applications, OFDM is utilized on the downlink (DL) and SC-FDMA is utilized on the uplink (UL) to support both frequency division duplexing (FDD) and time division duplexing (TDD). As those skilled in the art may readily appreciate from the description that follows, the various concepts presented herein are well suited for LTE applications. However, these concepts may be readily extended to various other telecommunication standards utilizing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. It should be appreciated that the actual wireless communication standard and the multiple access technology employed will depend on the specific application and the overall design constraints imposed on the system.

In an aspect of the disclosure, the eNB 354 may have multiple antennas supporting MIMO technology. The utilization of MIMO technology enables the eNB 354 to exploit the spatial domain to support spatial multiplexing, beamforming, and transmit diversity.

Spatial multiplexing may be utilized to transmit different streams of data simultaneously on the same frequency. In an example, data steams may be transmitted to a single UE 356 to increase data rate, or in another example, data steams may be transmitted to multiple UEs 356 to increase overall system capacity. This may be achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 356 with different spatial signatures, which enables each of the UE(s) 356 to recover the one or more data streams destined for that UE 356. On the uplink (UL), each UE 356 transmits a spatially precoded data stream, which enables the eNB 354 to identify the source of each spatially precoded data stream.

Spatial multiplexing is utilized when channel conditions are favorable. When channel conditions are less favorable, beamforming may be utilized to focus transmission energy in one or more directions. This may be achieved by spatially precoding the data for transmission through multiple antennas. To achieve good coverage at the edges of a cell, a single stream beamforming transmission may be utilized in combination with transmit diversity.

In the description that follows, various aspects of an access network will be described with reference to a MIMO system supporting OFDM on downlink (DL) and SC-FDMA on uplink (UL). OFDM is a spread-spectrum technique that modulates data over a number of subcarriers within an OFDM symbol. The subcarriers are spaced apart at precise frequencies. The spacing provides "orthogonality" that enables a receiver to recover data from subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4A:
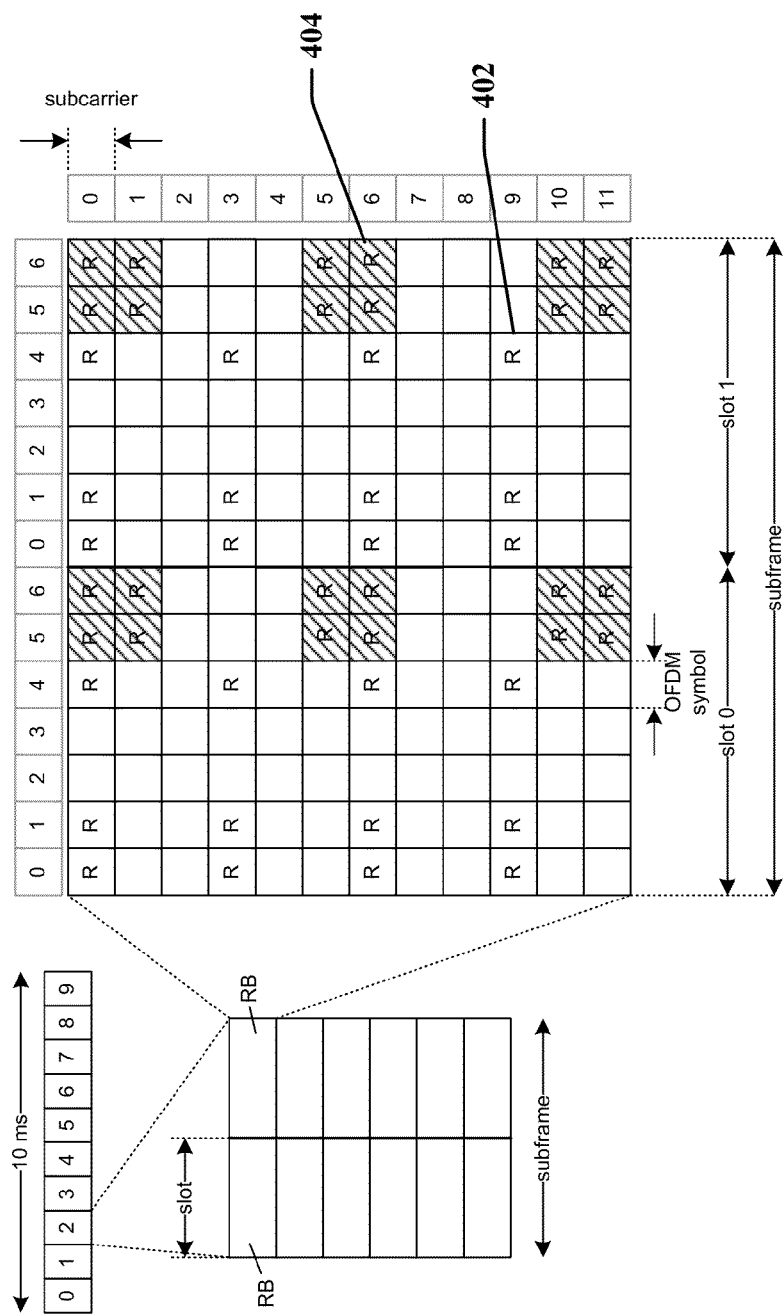
FIG. 4A is a diagram illustrating an example of a frame structure for use in an access network, in accordance with aspects of the disclosure.

In accordance with aspects of the disclosure, various frame structures may be utilized to support downlink (DL) and uplink (UL) transmissions. An example of a DL frame structure will now be presented with reference to FIG. 4A. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

In an implementation, a resource grid may be utilized to represent two time slots, each time slot including a Resource Block (RB). The resource grid is divided into multiple Resource Elements (REs). In LTE, a Resource Block (RB) may include 12 consecutive subcarriers in the frequency domain and, for a normal cyclic prefix in each OFDM symbol, 7 consecutive OFDM symbols in the time domain, or 84 Resource Elements (REs). Some of the REs, as indicated as R 402 and 404, may include DL Reference Signals (DL-RS). The DL-RS include Cell-specific RS (CRS) (which may be referred to as common RS) 402 and UE-specific RS (UE-RS) 404. UE-RS 404 may be transmitted only on the RBs upon which a corresponding Physical Downlink Shared CHannel (PDSCH) is mapped. The number of bits carried by each RE may depend on the modulation scheme. As such, the more RBs that a UE receives and the higher the modulation scheme, the higher the data rate for the UE.

Figure 4B:
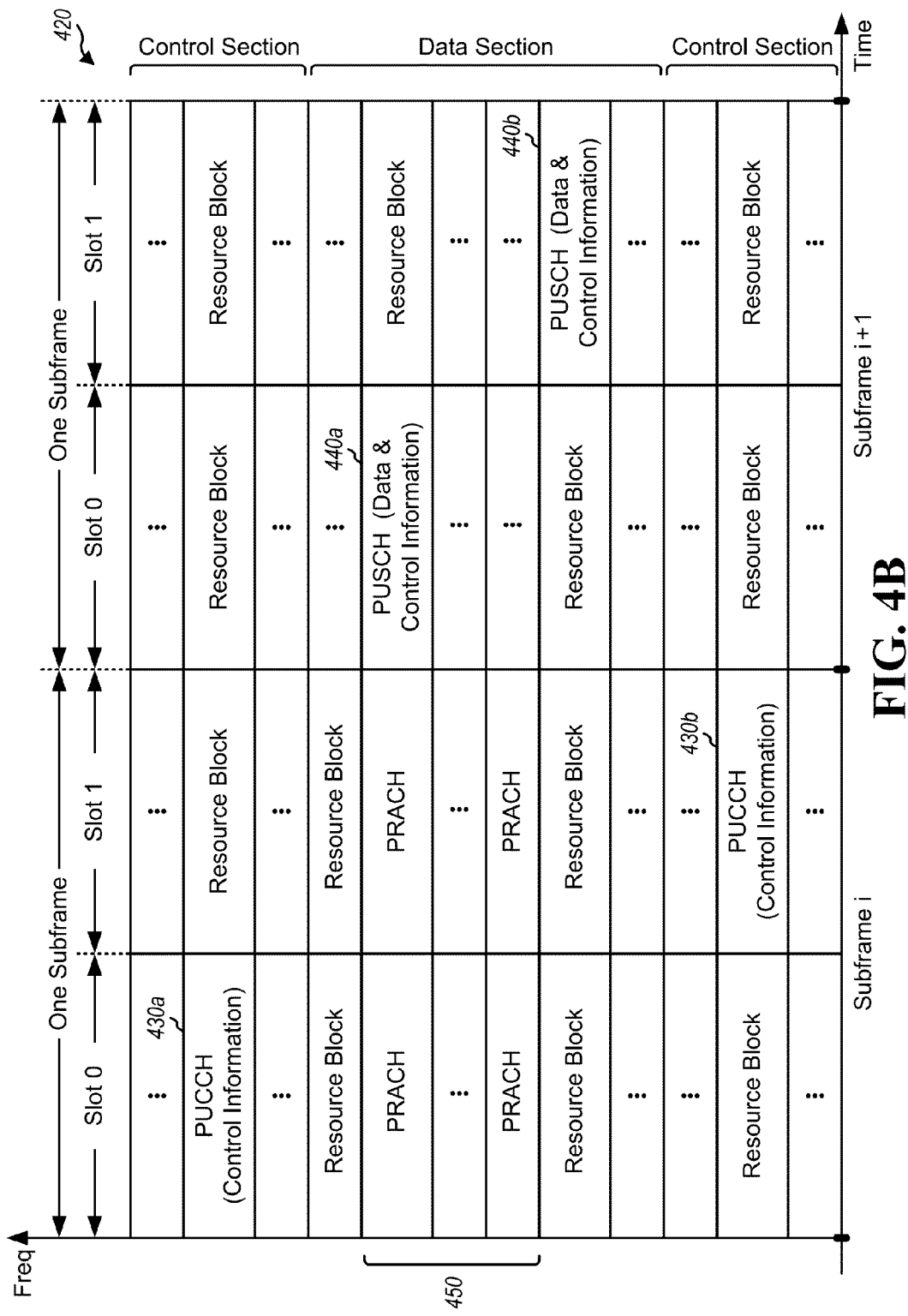
FIG. 4B shows an exemplary format for an uplink (UL) in a Long Term Evolution (LTE) network, in accordance with aspects of the disclosure.

Referring to FIG. 4B, an example of a UL frame structure 420 is provided in an embodiment of a format for the UL in LTE. Available Resource Blocks (RBs) for the UL may be partitioned into a data section and a control section. The control section may be formed at the two edges of the system bandwidth and may have a configurable size. The RBs in the control section may be assigned to UEs for transmission of control information. The data section may include RBs not included in the control section. The design in FIG. 4B results in the data section including contiguous subcarriers, which may allow a single UE to be assigned one or more of the contiguous subcarriers in the data section.

In an implementation, a UE may be assigned Resource Blocks (RBs) 430a, 430b in a control section to transmit control information to an eNB. The UE may be assigned RBs 440a, 440b in a data section to transmit data to the eNB. The UE may transmit control information in a Physical Uplink Control CHannel (PUCCH) on the assigned RBs in the control section. The UE may transmit only data or both data and control information in a Physical Uplink Shared CHannel (PUSCH) on the assigned RBs in the data section. A UL transmission may span both slots of a subframe and may hop across frequency, in a manner as shown in FIG. 4B.

In an aspect of the disclosure, referring to FIG. 4B, a set of RBs may be utilized to perform initial system access and achieve UL synchronization in a Physical Random Access CHannel (PRACH) 450. The PRACH 450 is configured to carry a random sequence and cannot carry any UL data/signaling. Each random access preamble occupies bandwidth corresponding to six consecutive RBs. The starting frequency may be specified by the network. That is, the transmission of the random access preamble is restricted to certain time and frequency resources. There is no frequency hopping for the PRACH. The PRACH attempt is carried in a single subframe (1 ms), and a UE may make only a single PRACH attempt per frame (10 ms).

It should be appreciated that the PUCCH, PUSCH, and PRACH in LTE are described in reference to 3GPP TS 36.211, entitled "Evolved Universal Terrestrial Radio Access (E-UTRA); Physical Channels and Modulation," which is publicly available.

The radio protocol architecture may take on various forms depending on the particular application. An example for an LTE system will now be presented with reference to FIG. 4C. In an aspect of the disclosure, FIG. 4C is a conceptual diagram illustrating an example of the radio protocol architecture for the user and control planes.

Figure 4C:
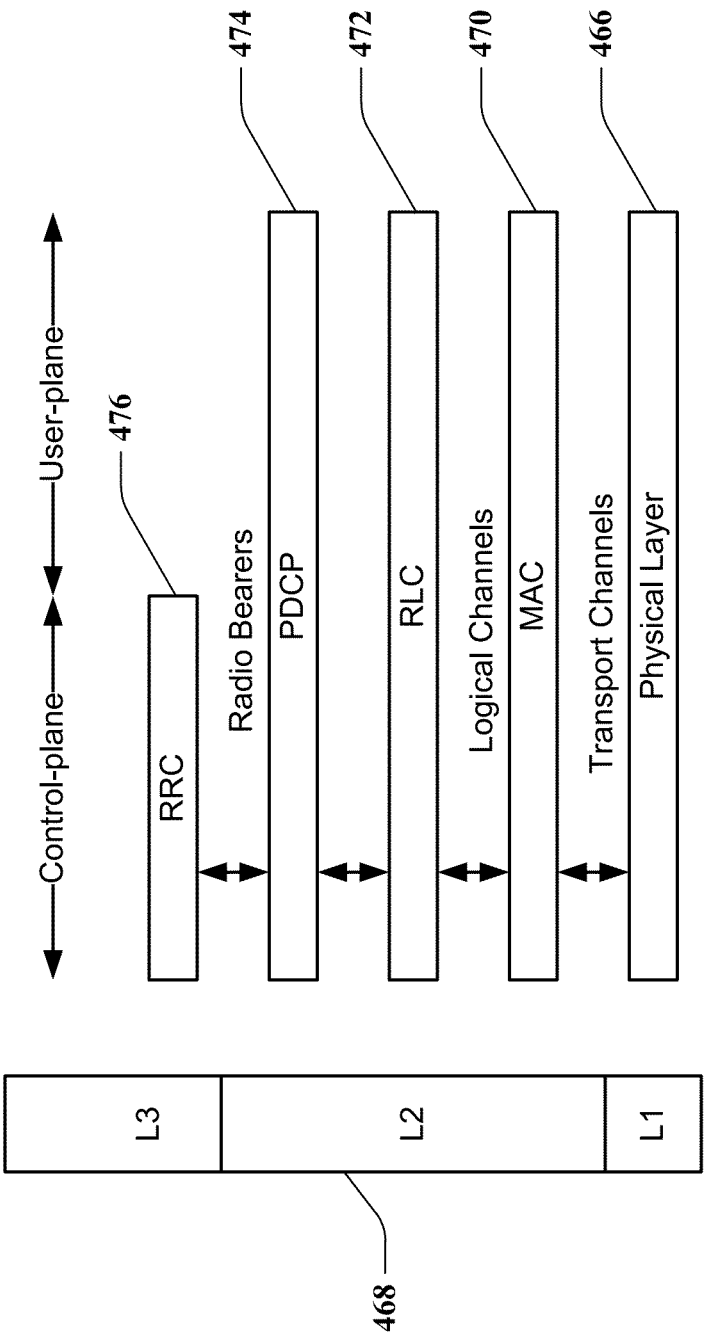
FIG. 4C is a diagram illustrating an example of a radio protocol architecture for the user and control plane, in accordance with aspects of the disclosure.

Referring to FIG. 4C, the radio protocol architecture for the UE and the eNB is shown with three layers: Layer 1 (L1), Layer 2 (L2), and Layer 3 (L3). L1 is the lowest layer and implements various physical layer signal processing functions. L1 is referred to herein as a physical layer 466. L2 468 is above the physical layer (L1) 466 and is responsible for the link between the UE and eNB over the physical layer (L1) 466.

In the user plane, the L2 layer 468 includes a media access control (MAC) sublayer 470, a radio link control (RLC) sublayer 472, and a Packet Data Convergence Protocol (PDCP) 474 sublayer, which are terminated at the eNB on the network side. Although not shown, the UE may have several upper layers above the L2 layer 468 including a network layer (e.g., IP layer) that is terminated at the PDN gateway 318 (e.g., see FIG. 3A) on the network side, and an application layer that is terminated at the other end of the connection (e.g., far end UE, server, etc.).

The PDCP sublayer 474 provides multiplexing between different radio bearers and logical channels. The PDCP sublayer 474 may provide header compression for upper layer data packets to reduce radio transmission overhead, security by ciphering the data packets, and/or handover support for UEs between eNBs. The RLC sublayer 472 provides segmentation and reassembly of upper layer data packets, retransmission of lost data packets, and/or reordering of data packets to compensate for out-of-order reception due to Hybrid Automatic Repeat Request (HARQ). The MAC sublayer 470 provides multiplexing between logical and transport channels, and the MAC sublayer 470 is responsible for allocating the various radio resources (e.g., RBs) in one cell among the UEs. The MAC sublayer 470 is responsible for HARQ operations.

In the control plane, the radio protocol architecture for the UE and eNB is substantially the same for the physical layer 466 and the L2 layer 468 with the exception that there is no header compression function for the control plane. The control plane includes a Radio Resource Control (RRC) sublayer 476 in Layer 3. The RRC sublayer 476 is responsible for obtaining radio resources (i.e., radio bearers) and for configuring the lower layers utilizing RRC signaling between the eNB and the UE.

Figure 5:
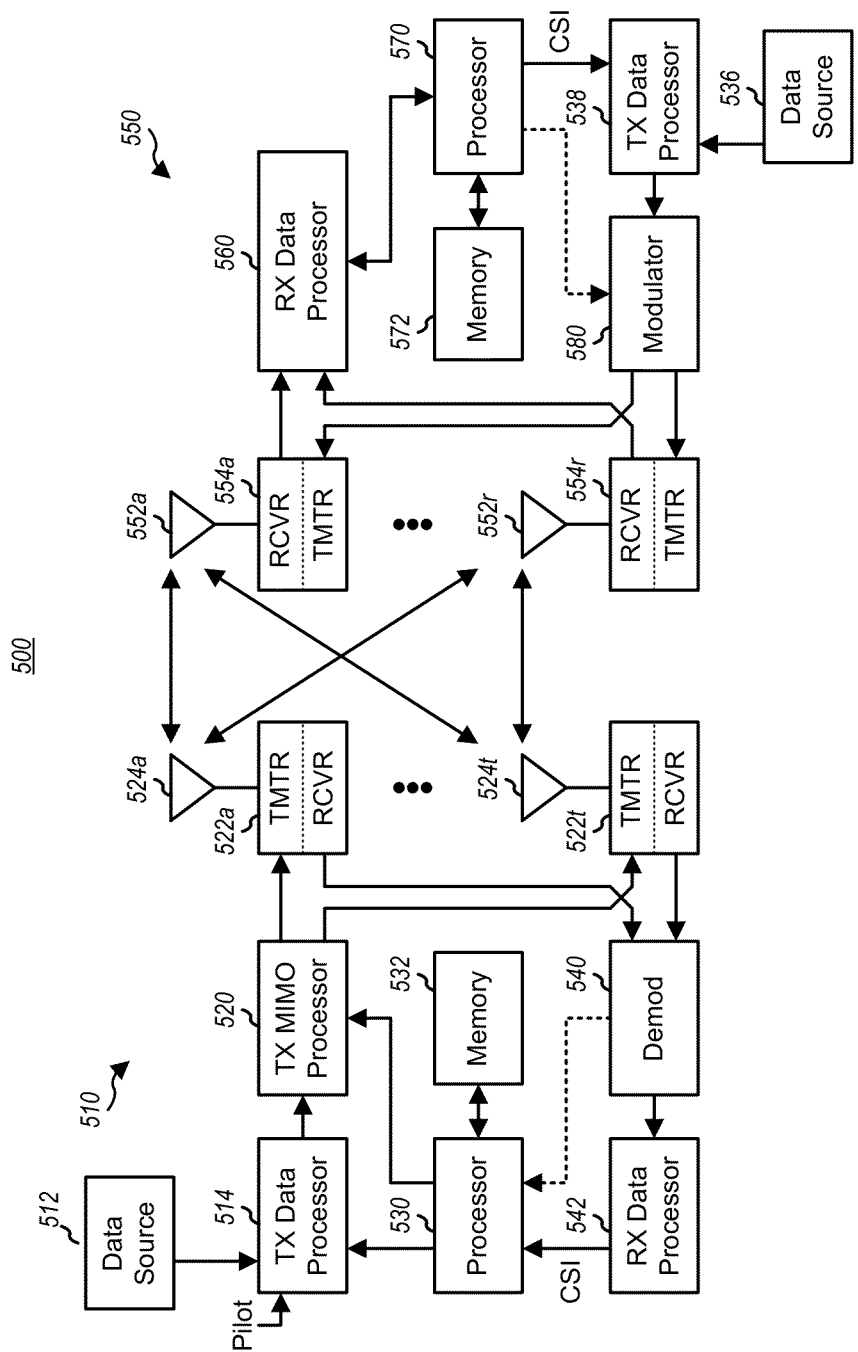
FIG. 5 illustrates a block diagram of a communication system, in accordance with an embodiment of the disclosure, in accordance with aspects of the disclosure.

FIG. 5 is a block diagram of an embodiment of a transmitter system 510 (e.g., an access point) and a receiver system 550 (e.g., an access terminal) in a MIMO system 500, in accordance with an aspect of the disclosure. At the transmitter system 510, traffic data for a number of data streams is provided from a data source 512 to a transmit (TX) data processor 514. Each data stream may be transmitted over a respective transmit antenna, and the TX data processor 514 may format, code, and interleave the traffic data for each data stream based on a particular coding scheme selected for that data stream to provide coded data.

The coded data for each data stream may be multiplexed with pilot data utilizing Orthogonal Frequency Division Multiplexing (OFDM) techniques. The pilot data is typically a known data pattern that is processed in a known manner and may be utilized at the receiver system to estimate the channel response. The multiplexed pilot and coded data for each data stream is then modulated (i.e., symbol mapped) based on a particular modulation scheme (e.g., Binary Phase-Shift Keying (BPSK), Quadrature Phase-Shift Keying (QPSK), M-Phase-Shift Keying (M-PSK), M-Quadrature Amplitude Modulation (M-QAM)) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). The TX MIMO processor 520 then provides $N_T$ modulation symbol streams to the $N_T$ transmitters (TMTR) 522*a* through 522*t*. In certain embodiments, the TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 522*a* through 522*t* are then transmitted from the $N_T$ antennas 524*a* through 524*t*, respectively.

At the receiver system 550, the transmitted modulated signals are received by the $N_R$ antennas 552*a* through 552*r* and the received signal from each antenna 552 is provided to a respective receiver (RCVR) 554*a* through 554*r*. Each receiver 554 conditions (e.g., filters, amplifies, and/or down-converts) a respective received signal, digitizes the conditioned signal to provide samples, and further processes the samples to provide a corresponding "received" symbol stream.

An RX data processor 560 then receives and processes the $N_R$ received symbol streams from the $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the transmitter system 510. In an embodiment, a processor 570 is configured to periodically determine which pre-coding matrix to use (discussed below). The processor 570 formulates a reverse link or UL message comprising a matrix index portion and a rank value portion.

In an aspect of the disclosure, the reverse link or UL message may comprise various types of information regarding the communication link and/or the received data stream. The reverse link or uplink (UL) message is then processed by a TX data processor 538, which also receives traffic data for a number of data streams from a data source 536, modulated by a modulator 580, conditioned by the transmitters 554*a* through 554*r*, and transmitted back to the transmitter system 510.

At the transmitter system 510, the modulated signals from the receiver system 550 are received by the antennas 524, conditioned by the receivers 522, demodulated by a demodulator 540, and processed by a RX data processor 542 to extract the reverse link or uplink (UL) message transmitted by the receiver system 550. The processor 530 then determines which pre-coding matrix to use for determining the beamforming weights then processes the extracted message.

In accordance with aspects of the disclosure, logical channels are classified into Control Channels and Traffic Channels. Logical Control Channels comprises Broadcast Control CHannel (BCCH), which is downlink (DL) channel for broadcasting system control information. Paging Control CHannel (PCCH), which is DL channel that transfers paging information. Multicast Control CHannel (MCCH), which is point-to-multipoint DL channel utilized for transmitting Multimedia Broadcast and Multicast Service (MBMS) scheduling and control information for one or several MTCHs. Generally, after establishing RRC connection, this channel is only utilized by UEs that receive MBMS (Note: old MCCH+MSCH). Dedicated Control CHannel (DCCH) is point-to-point bi-directional channel that transmits dedicated control information and utilized by UEs having an RRC connection. Logical Traffic Channels comprise a Dedicated Traffic Channel (DTCH), which is point-to-point bi-directional channel, dedicated to one UE, for the transfer of user information. Also, a Multicast Traffic CHannel (MTCH) for point-to-multipoint DL channel for transmitting traffic data.

In accordance with aspects of the disclosure, Transport Channels may be classified into downlink (DL) and uplink (UL). DL Transport Channels comprises a Broadcast CHannel (BCH), Downlink Shared Data CHannel (DL-SDCH) and a Paging CHannel (PCH), the PCH for support of UE power saving (DRX cycle is indicated by the network to the UE), broadcasted over entire cell and mapped to PHY resources which may be utilized for other control/traffic channels. The UL Transport Channels comprises a Random Access CHannel (RACH), a Request CHannel (REQCH), an Uplink Shared Data CHannel (UL-SDCH) and plurality of PHY channels. The PHY channels comprise a set of Downlink (DL) channels and Uplink (UL) channels.

The DL PHY channels comprises:
Common Pilot CHannel (CPICH)
Synchronization CHannel (SCH)
Common Control CHannel (CCCH)
Shared DL Control CHannel (SDCCH)
Multicast Control CHannel (MCCH)
Shared UL Assignment CHannel (SUACH)
Acknowledgement CHannel (ACKCH)
DL Physical Shared Data CHannel (DL-PSDCH)
UL Power Control CHannel (UPCCH)
Paging Indicator CHannel (PICH)
Load Indicator CHannel (LICH)
The UL PHY Channels comprises :
Physical Random Access CHannel (PRACH)
Channel Quality Indicator CHannel (CQICH)
Acknowledgement CHannel (ACKCH)
Antenna Subset Indicator CHannel (ASICH)
Shared Request CHannel (SREQCH)
UL Physical Shared Data CHannel (UL-PSDCH)
Broadband Pilot CHannel (BPICH)

In an aspect of the disclosure, a channel structure is provided that preserves low PAR (at any given time, the channel is contiguous or uniformly spaced in frequency) properties of a single carrier waveform.

For the purposes of the disclosure, the following abbreviations apply:
ACK Acknowledgement
AM Acknowledged Mode
AMD Acknowledged Mode Data
AMR Adaptive Multi-Rate
ARQ Automatic Repeat Request
BCCH Broadcast Control CHannel
BCH Broadcast CHannel
BPSK Binary Phase-Shift Keying
BW Bandwidth
C— Control—
CCE Control Channel Element
CCCH Common Control CHannel
CCH Control CHannel
CCTrCH Coded Composite Transport CHannel
CDM Code Division Multiplexing
CP Cyclic Prefix CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DL-SCH Downlink Shared CHannel
DM-RS DeModulated Reference Signal
DRS Dedicated Reference Signal
DSCH Downlink Shared CHannel
DTCH Dedicated Traffic CHannel
E-CID Enhanced Cell IDentification
EPS Evolved Packet System
FACH Forward link Access CHannel
FDD Frequency Division Duplex
FDM Frequency Division Multiplex
FSTD Frequency Switched Transmit Diversity
HARQ Hybrid Automatic Repeat/reQuest
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MBSFN Multicast Broadcast Single Frequency Network
MCCH MBMS point-to-multipoint Control CHannel
MCH Multicast CHannel
M-PSK M-Phase-Shift Keying
M-QAM M-Quadrature Amplitude Modulation
MRW Move Receiving Window
MSB Most Significant Bit
MSCH MBMS point-to-multipoint Scheduling CHannel
MTCH MBMS point-to-multipoint Traffic CHannel
NAK Non-Acknowledgement
OFDM Orthogonal Frequency Division Multiplexing
PA Power Amplifier
PCCH Paging Control CHannel
PCH Paging CHannel
PCI Physical Cell Identifier
PDCCH Physical Downlink Control CHannel
PCFICH Physical Control Format Indicator CHannel
PDSCH Physical Downlink Shared CHannel
PHICH Physical HARQ Indicator CHannel
PDU Protocol Data Unit
PHY PHYsical layer
PhyCH Physical CHannels
PMI Precoding Matrix Indicator
PRACH Physical Random Access Channel
PRB Physical Resource Block
PSS/SSS Primary/Secondary Synchronization Signals
PUCCH Physical Uplink Control CHannel
PUSCH Physical Uplink Shared CHannel
QPSK Quadrature Phase-Shift Keying
R- Relay
RACH Random Access CHannel
RB Resource Block
RLC Radio Link Control
RRC Radio Resource Control
RE Resource Element
R-PDCCH Relay-Physical Downlink Control Channel
R-PHICH Relay-Physical HARQ Indicator CHannel
RS Reference Signal
RTT Round Trip Time
Rx Receive
SAP Service Access Point
SDU Service Data Unit
SFBC Space Frequency Block Code
SHCCH SHared Control CHannel
SINR Signal-to-Interference-and-Noise Ratio
SN Sequence Number
SR Scheduling Request
SRS Sounding Reference Signal
SU-MIMO Single User Multiple Input Multiple Output
SUFI SUper FIeld
TA Timing Advance
TCH Traffic CHannel
TDD Time Division Duplex
TDM Time Division Multiplex
TFI Transport Format Indicator
TPC Transmit Power Control
TTI Transmission Time Interval
Tx Transmit
U— User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network In accordance with aspects of the disclosure, the systems, apparatus, and methods described herein are configured for allocating downlink (DL) and/or uplink (UL) grants associated with a control channel in a wireless communication system. Various examples presented herein are given for the case of a specific control channel (e.g., Relay-Physical Downlink Control CHannel (R-PDCCH)). However, it should be appreciated that various aspects described herein may be applied to any suitable control channel. Moreover, it should be appreciated that the claimed subject matter is not intended to be limited to any specific control channel(s) unless stated otherwise.

Figure 6:
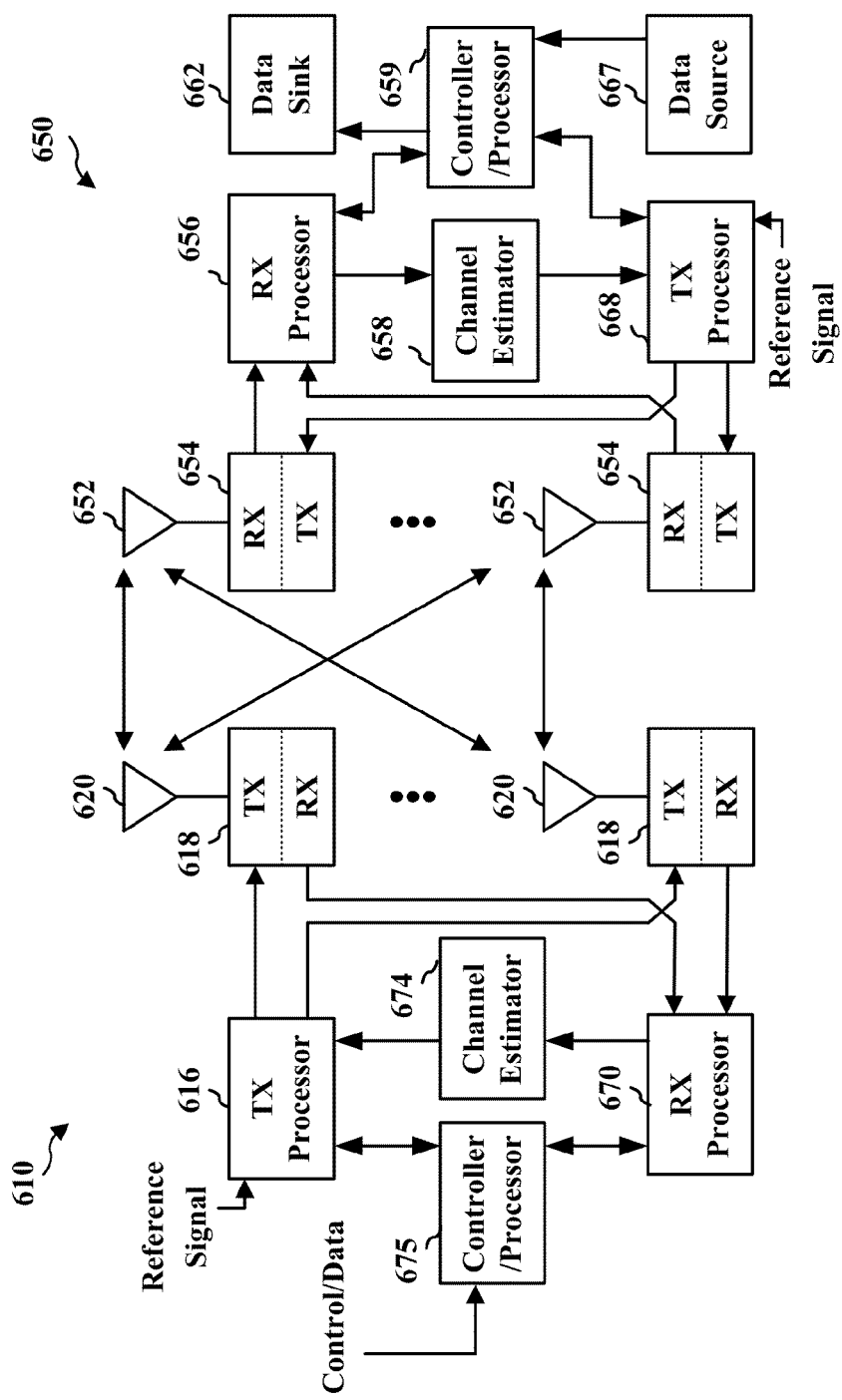
FIG. 6 is a diagram illustrating an example of an evolved Node B (eNB) and user equipment (UE) in an access network, in accordance with aspects of the disclosure.

In accordance with an aspect of the disclosure, FIG. 6 is a block diagram of an eNB 610 in communication with a UE 650 in an access network. In the DL, upper layer packets from the core network are provided to a controller/processor 675. The controller/processor 675 implements the functionality of the L2 layer described herein with reference to FIG. 6. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM)). The coded and modulated symbols are then split into parallel streams. Each stream is then mapped to an OFDM subcarrier, multiplexed with a reference signal (e.g., pilot) in the time and/or frequency domain, and then combined together utilizing an Inverse Fast Fourier Transform (IFFT) to produce a physical channel carrying a time domain OFDM symbol stream. The OFDM stream is spatially precoded to produce multiple spatial streams.

Channel estimates from a channel estimator 674 may be utilized to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. At the UE 650, each receiver 654RX receives a signal through its respective antenna 652. Each receiver 654RX recovers information modulated onto an RF carrier and provides the information to the receiver (RX) processor 656.

The RX processor 656 is configured to implement various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain utilizing a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to a controller/processor 659.

The controller/processor 659 implements the L2 layer described earlier in connection with FIG. 4C. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. In accordance with aspects of the disclosure, the controller/processor 659 is responsible for error detection utilizing a positive acknowledgement (ACK) and/or negative acknowledgement (NAK) protocol to support HARQ operation including, for example, Physical HARQ Indicator CHannel (PHICH) operation.

In the UL, a data source 667 is utilized to provide upper layer packets to the controller/processor 659. The data source 667 represents all protocol layers above the L2 layer (L2). Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be utilized by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer.

In one aspect of the disclosure, the controller/processor 659 is configured to implement the L2 layer described herein with reference to FIG. 4C. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection utilizing an ACK and/or NAK protocol to support HARQ operations.

In one embodiment of the disclosure, the processing system 114 described in relation to FIG. 1 may include the eNB 610. As such, the processing system 114 may include the TX processor 616, the RX processor 670, and the controller/processor 675.

In another embodiment of the disclosure, the processing system 114 described in relation to FIG. 1 may includes the UE 650. As such, the processing system 114 may include the TX processor 668, the RX processor 656, and the controller/processor 659.

Figure 7:
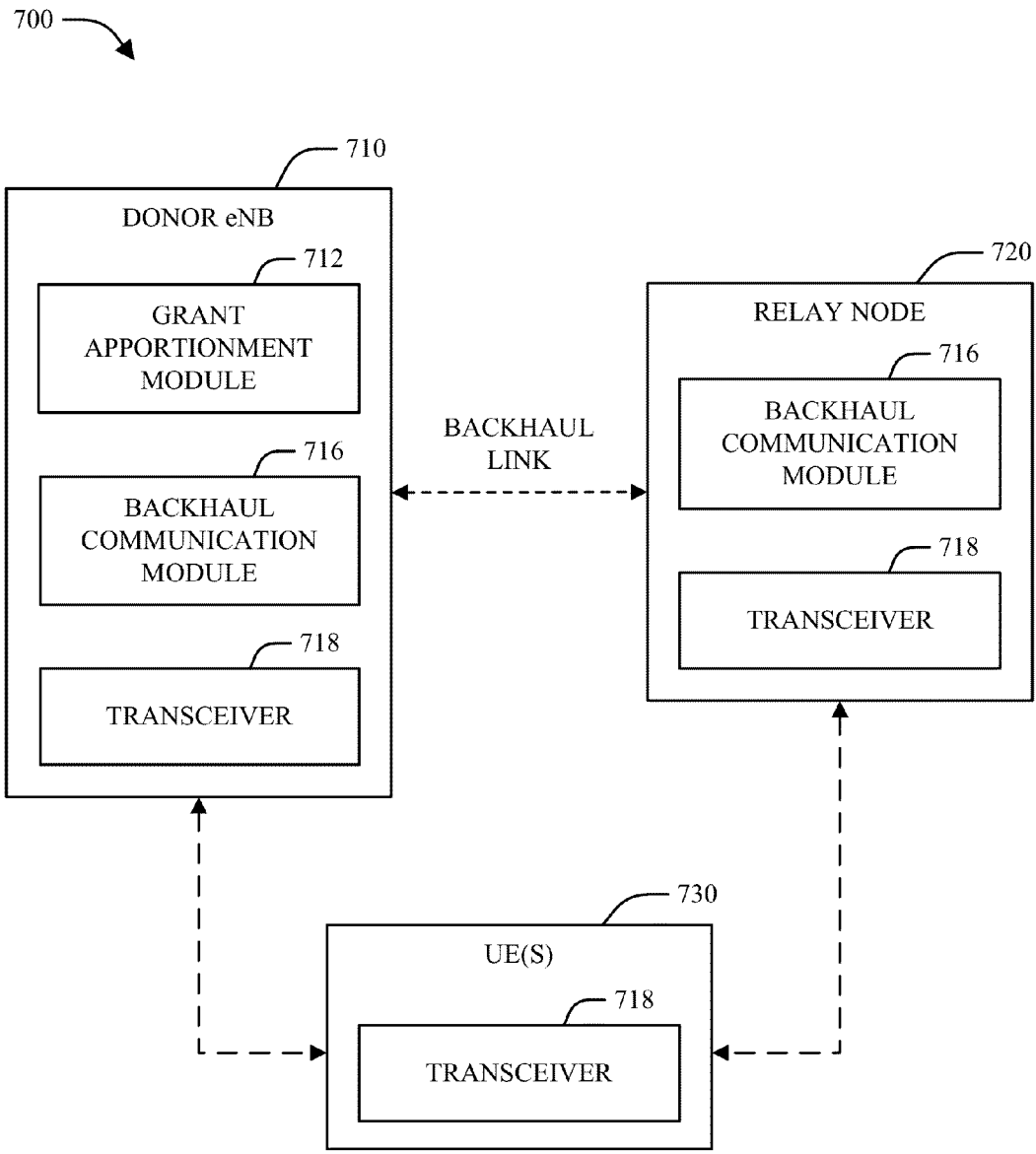
FIG. 7 is a block diagram of a system for generating and utilizing resource grants within a relay-assisted wireless communication system, in accordance with aspects of the disclosure.

Referring to FIG. 7, a block diagram of a system 700 for generating and utilizing resource grants within a relay-assisted wireless communication system is illustrated, in accordance with aspects of the disclosure. In an implementation, the system 700 may include one or more network nodes that may include a network node referred to herein as a Donor evolved Node B (DeNB) 710 that provides communication service to one or more user equipment (UE) 710. Further, the network nodes in the system 700 may include one or more Relay Nodes (RNs) 720, which may assist in facilitating communication between the DeNB 710 and the one or more UEs 730.

In an aspect of the disclosure, the UE 730 may engage in one or more uplink (UL) communications with the DeNB 710 and/or the RN 720, and the DeNB 710 and/or the RN 720 may engage in one or more downlink (DL) communications with the UE 730. Either additionally or alternatively, the DeNB 710, the RN 720, and/or the UE 730 may engage in any suitable communication(s) with each other, with other devices or entities in system 700, and/or any other suitable entities. For example, a backhaul link and/or other means may be provided between the DeNB 710 and the RN 720 (e.g., directly or indirectly through a central network entity (not shown)) to facilitate communication therebetween. As shown in system 700, the DeNB 710, the RN 720, and/or the UE 730 may utilize respective transceivers 718 and/or any other suitable means for communication within the system 700. In an example, the RN 720 may include some or all of the functionality of an eNB in the system 700, such as the DeNB 710 or the like. Alternatively, the RN 720 may be a specialized network node dedicated to assisting in communication between the DeNB 710 and any related UEs 730.

In another aspect of the disclosure, the DeNB 710 and the RN 720 may utilize one or more backhaul links and/or other means to facilitate cooperative communication to one or more of the UEs 730. Therefore, as shown by the system 700, the DeNB 710 and the RN 720 may utilize a backhaul communication module 716 and/or any other suitable means to facilitate transfer of information to each other to facilitate cooperative communication with one or more of the UEs 730. The backhaul communication module 716 may be independent of and/or implemented by one or more of the transceivers 718.

In an aspect of the disclosure, resources utilized for communication on a backhaul link between the DeNB 710 and the RN 720 may be controlled at least in part via UL and/or DL resource grants generated by DeNB 710. In an example, the DeNB 710 may schedule transmission of respective UL and/or DL grants to the RN 720 on an associated control channel (e.g., R-PDCCH, etc.) and provide information corresponding to the associated control channel to the RN 720 independently and/or with one or more other channels. For example, referring to FIG. 8A, R-PDCCH transmission may be arranged in a Frequency Division Multiplex (FDM) manner as shown by diagram 802 and/or in a hybrid FDM/TDM (Time Division Multiplex) manner as shown by diagram 804.

In an implementation, the DeNB 710 may be configured for providing at least one control channel for DL grant information, providing at least one other control channel for UL grant information, and adjusting time apportioned for the DL and UL grant information in the control channels. These and other aspects of the disclosure are described herein. In various other implementations, the RN 720 and/or the UE 730 may be configured with similar functionality as the DeNB 710.

In an implementation, the RN 720 and/or the UE 730 may be configured for determining time apportioned for DL grant information in at least one control channel, determining time apportioned for UL grant information in at least one other control channel, and receiving DL and UL grant information in the control channels. These and other aspects of the disclosure are described herein. In another implementation, the DeNB 710 may be configured with similar functionality as the RN 720 and/or the UE 730.

Figure 8A:
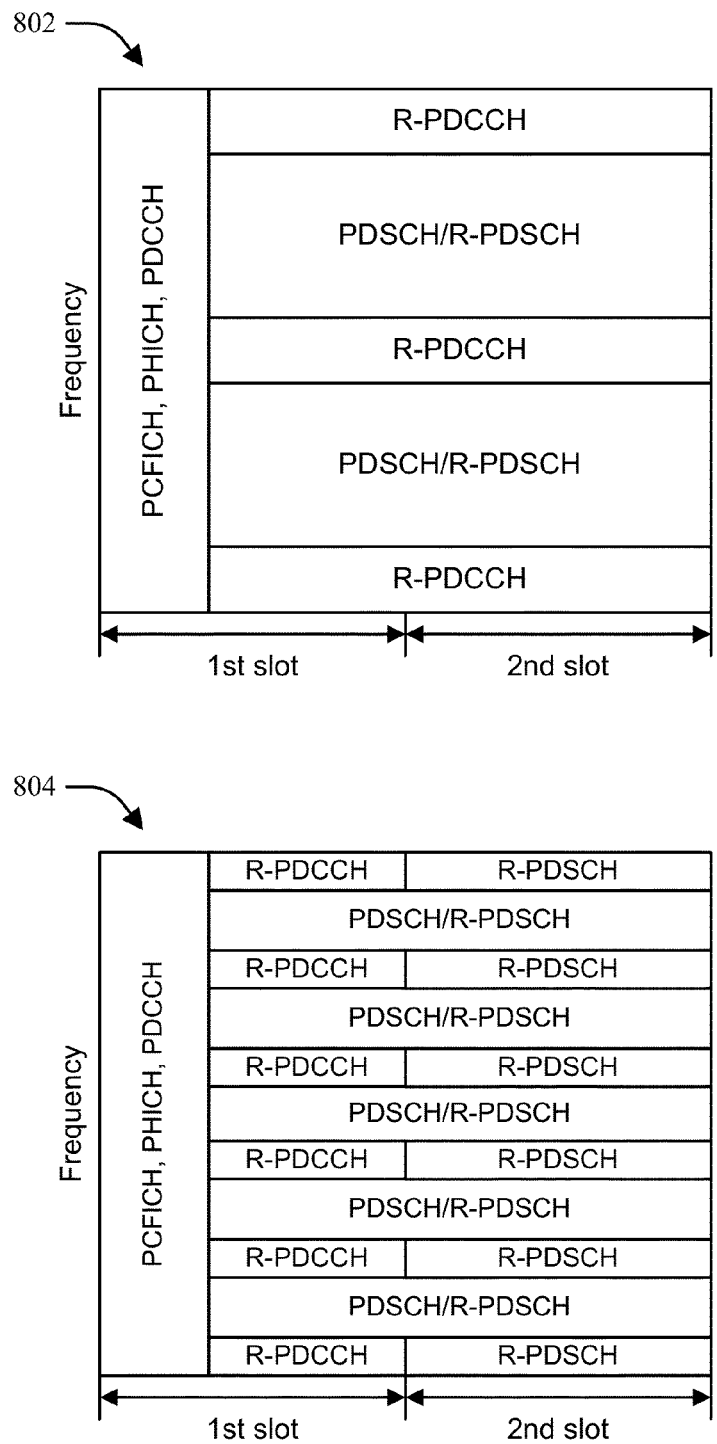
FIGS. 8A, 8B, 8C illustrate example downlink (DL) and uplink (UL) grant allocations that may be utilized in accordance with aspects of the disclosure.
Figure 8B:
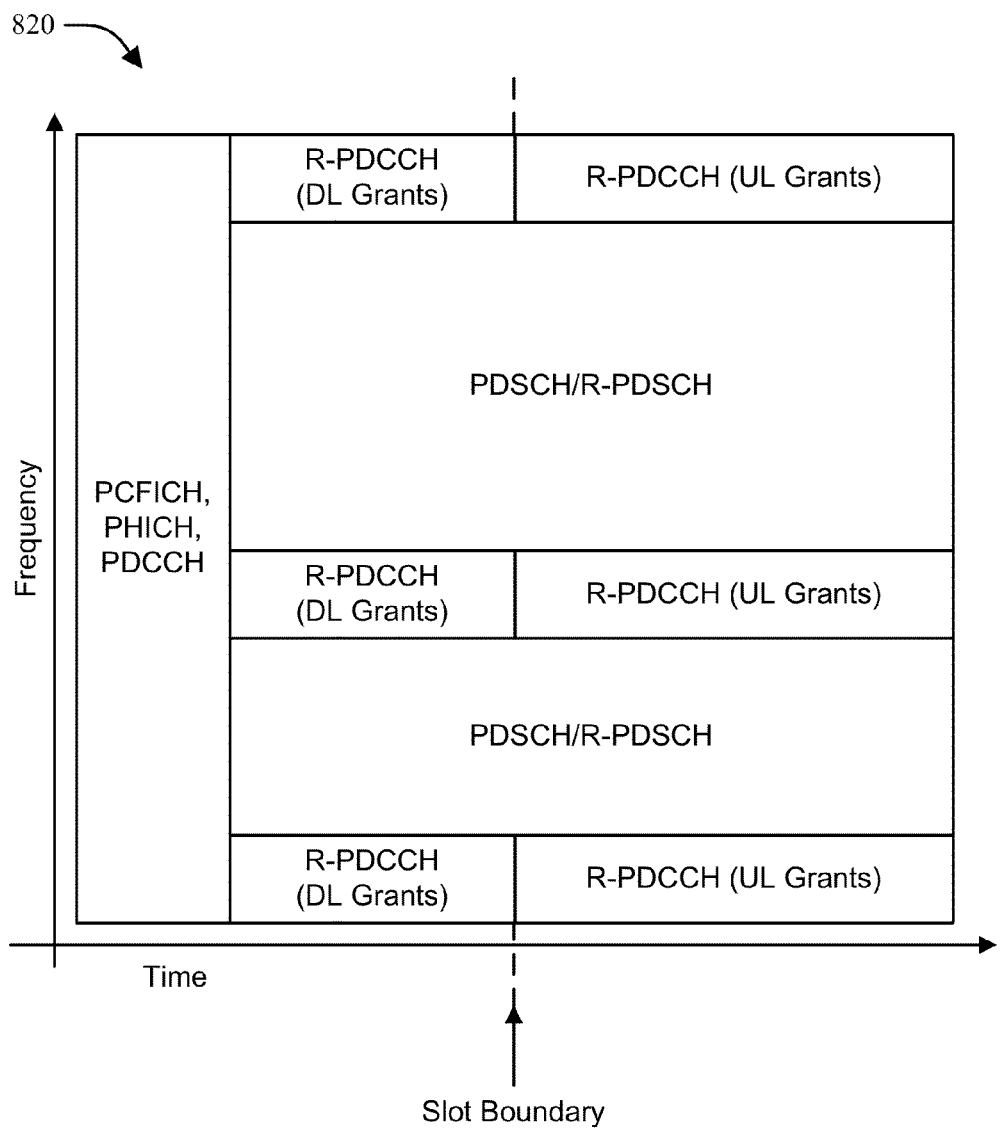

In an example, to facilitate early decoding of backhaul grants (e.g., corresponding to R-PDCCH), the pure FDM design illustrated by diagram 804 in FIG. 8A may be implemented in a form shown by diagram 820 in FIG. 8B, wherein DL grants occur in a first slot in time and UL grants occur in the second slot. However, as shown in diagram 820, due to transmission of PCFICH, PHICH, PDCCH, and/or other control channels, the amount of time given to DL and UL grants are unequal such that UL grants are apportioned more time than DL grants. Therefore, it may be desirable to optimize the time split between DL and UL grants in a control channel transmission to provide improved adaptability for various DL and UL grant configurations, wherein DL grants are apportioned more time and UL grants are apportioned less time to increase the DL capacity.

Accordingly, in an aspect of the disclosure, the DeNB 710 may include a grant apportionment module 712, as shown in FIG. 7, which may adjust a time split for DL and UL grants in a control channel transmission and/or apportion DL and UL grant resources based at least in part on a starting symbol and/or an ending symbol of a control channel corresponding to the transmission. For instance, as shown in diagram 840 in FIG. 8C, a starting symbol (e.g., s1) for R-PDCCH transmission and an ending symbol (e.g., s2) for R-PDCCH transmission may be utilized to identify a transition time (e.g., s4) for UL grants and DL grants that is disparate from a slot boundary of FIG. 8B. In an aspect of the disclosure, the grant apportionment module 712 of FIG. 7 is configured to provide a means for selectively adjusting DL and UL grant apportionment time. For example, in an implementation, the grant apportionment module 712 is configured to provide a means for increasing the DL grant apportionment time and decreasing the UL grant apportionment time by adjusting the transition time (e.g., s4) for DL grants and UL grants that is disparate from the slot boundary, as shown for example in FIG. 8C. This provides for an increase in the DL control capacity.

In various implementations, in addition to the starting symbol (s1), the ending symbol (s2), and transition time (s4), various other factors, such as early decoding tolerance, backhaul subframe configurations, or the like, may be considered. Various examples that may be utilized for DL and UL grant allocation are provided herein.

In accordance with aspects of the disclosure, relaying may be considered for LTE-Advanced (LTE-A) as a means to improve, for example, coverage of high data rates, group mobility, temporary network deployment, and cell-edge throughput, and/or to provide coverage in new areas. Relay nodes are wirelessly connected to radio-access networks via a donor cell, such as a Donor eNB (DeNB). In an example, a connection may be inband, in which case the network-to-relay link share the same band with direct network-to-UE links within the donor cell. Rel-8 UEs should be able to connect to the donor cell in this case. In another example, a connection may be outband, in which case the network-to-relay link does not operate in the same band as direct network-to-UE links within the donor cell.

In accordance with aspects of the disclosure, at least Type 1 Relay Nodes (RN) are part of LTE-A, wherein Type 1 RNs comprise inband relaying nodes. Type 1 RNs may be configured to control cells with each Type 1 RNs appearing to a UE as a separate cell distinct from the donor cell. Each cell may have a Physical Cell ID, as defined in LTE Rel-8, and each RN transmits synchronization channels, reference symbols, etc.

In single-cell operation, UEs may receive scheduling information and HARQ feedback directly from the RN, and each UE sends control channels (e.g., SR, CQI, ACK, etc.) to the RN. Referring to LTE-A compatible UEs, Type 1 RNs may appear differently than a Rel-8 eNB to allow for performance enhancement.

For inband relaying, the eNB-to-relay link may operate in a same frequency spectrum as a relay-to-UE link. In some instances, due to a relay transmitter causing interference to its own receiver, simultaneous eNB-to-relay and relay-to-UE transmissions on the same frequency resource may not be feasible.

To allow inband backhauling of the relay traffic on the relay-eNB link, some resources in the time-frequency space may be set aside for this link and may not be utilized for an access link on a respective node.

In an implementation, a principle of resource partitioning at a half-duplex relay may be provided as follows:

eNB→RN and RN→UE links are time division multiplexed in a single frequency band (only one is active at any time)

RN→eNB and UE→RN links are time division multiplexed in a single frequency band (only one is active at any time)

In a case of DL backhaul in DL resources, the following may be valid. At the RN, the access link DL subframe boundary may be aligned with the backhaul link DL subframe boundary, except for possible adjustment to allow for RN transmit/receive switching. A set of DL backhaul subframes, during which DL backhaul transmission may occur, may be semi-statically assigned. A set of UL backhaul subframes, during which UL backhaul transmission may occur, may be semi-statically assigned, or implicitly derived from the DL backhaul subframes using a HARQ timing relationship.

In an implementation, a physical control channel (e.g., R-PDCCH) may be utilized to dynamically or semi-persistently assign resources, within semi-statically assigned subframes, for DL backhaul data (corresponding to the "R-PDSCH" physical channel). The R-PDCCH may assign DL resources in the same and/or in one or more later subframes. The R-PDCCH may also be utilized to dynamically or semi-persistently assign resources for the UL backhaul data (e.g., the R-PUSCH physical channel). The R-PDCCH may assign UL resources in one or more later subframes.

In an implementation, within Physical Resource Blocks (PRBs) that are semi-statically assigned for R-PDCCH transmission, a subset of resources may be utilized for each R-PDCCH. It should be appreciated that the overall set of resources utilized for R-PDCCH transmission within the above mentioned semi-statically assigned PRBs may vary dynamically between subframes. These resources may correspond to a full set of OFDM symbols available for the backhaul link or be constrained to a subset of these OFDM symbols. The resources that are not utilized for R-PDCCH within the above mentioned semi-statically assigned PRBs may be used to carry R-PDSCH or PDSCH.

The detailed R-PDCCH transmitter processing (e.g., channel coding, interleaving, multiplexing, etc.) may reuse Rel-8 functionality to any extent possible, but allow removing some unnecessary procedure or bandwidth-wasting procedure by considering the relay property. If the "search space" approach of Rel-8 is utilized for the backhaul link, use of common search space, which may be semi-statically configured (and potentially includes entire system bandwidth), refers to a baseline. If RN-specific search space is configured, it could be implicitly or explicitly known by RN.

The R-PDCCH is transmitted starting from an OFDM symbol within the subframe that is late enough so that the relay is able to receive it. R-PDSCH and R-PDCCH may be transmitted within the same PRBs or within separated PRBs.

In an aspect of the disclosure, R-PDCCH placement options include a pure FDM design, as shown for example in diagram 802 of FIG. 8A, and a Hybrid FDM+TDM design, as shown for example in diagram 804 of FIG. 8A.

In an implementation, the pure FDM scheme allocates a number of Resource Blocks (RBs) for transmitting R-PDCCH (and possibly R-PHICH, if supported). As shown in diagram 802 of FIG. 8A, the pure FDM is configured to separate the relay control region from PDSCH and R-PDSCH transmissions, which facilitates multiplexing and minimizes scheduling complexity. A single R-PDCCH may be interleaved across a number of RBs (e.g., fewer than a total number of RBs reserved for R-PDCCH) to achieve frequency and interference diversity.

In another implementation, as shown in diagram 804 of FIG. 8A, the Hybrid FDM+TDM also transmits R-PDCCH on a subset of RBs but among those allocates only symbols within a first slot. The remaining resources may be utilized to carry R-PDSCH and any remaining RBs not carrying R-PDCCH may be utilized for PDSCH or R-PDSCH transmissions.

In an aspect of the disclosure, to achieve early decoding of R-PDCCH, the pure FDM design may have a form where DL grants are in a first slot and UL grants are in a second slot, as shown in diagram 820 of FIG. 8B. It should be appreciated that, in some instances, the DL and UL grants of the same Physical Resource Block (PRB) pair may or may not belong to the same Relay Node (RN).

Referring to diagram 820 of FIG. 8B, DL grants may be transmitted in the first slot of a subframe. If a DL grant is transmitted in the first PRB of a given PRB pair, then a UL grant may be transmitted in the second PRB of the PRB pair. In case of a Demodulated Reference Signal (DM-RS), the DL grant and UL grant in a PRB pair may be for the same RN. In such a PRB pair, no REs may be used for a different RN. In case of a Common Reference Signal (CRS), the DL grant and UL grant in a PRB pair may be for the same or different RNs.

Figure 8C:
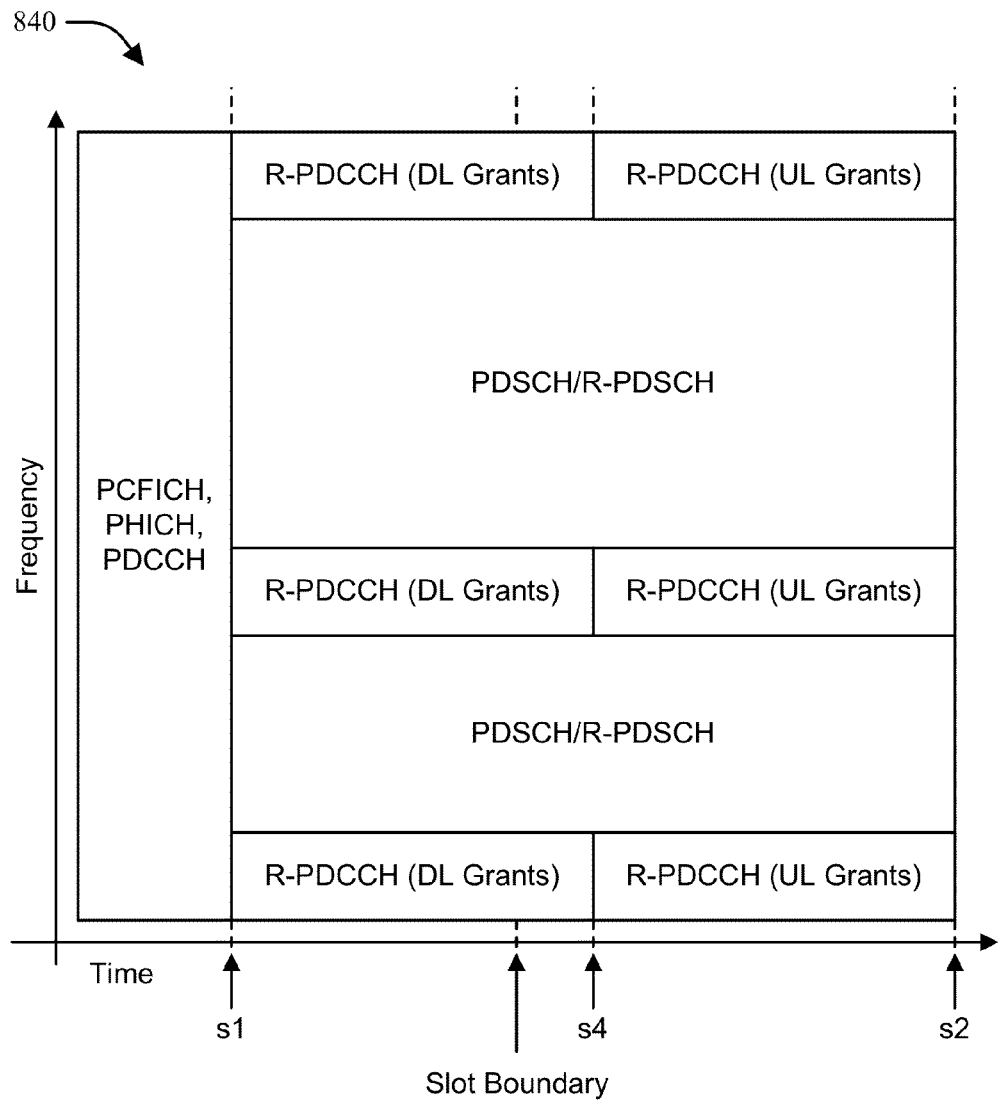

In an implementation, within a subframe, a starting symbol index for R-PDCCH may depend on the number of control symbols in DeNB, the number of symbols in RN, the DL backhaul timing, the switching time, the interference tolerance from other cells, etc. Referring to FIG. 8C, symbol numbering within the subframe starts at 0, R-PDCCH starts at symbol s1, and R-PDSCH starts at symbol s2 in PRB(s) not containing R-PDCCH.

In accordance with aspects of the disclosure, optimizing a time split between DL and UL grants may be based on one or more of an R-PDCCH starting symbol, an R-PDCCH ending symbol, an R-PDCCH early decoding tolerance (e.g., a largest possible symbol index for DL grants when early decoding R-PDCCH is deemed desirable—if no such requirement, the largest possible symbol index is effectively equal to the R-PDCCH ending symbol), and/or DL/UL backhaul subframe configurations. In an example, for symmetric DL/UL configurations, the time split between DL and UL grants may be such that DL PDCCH capacity and UL PDCCH capacity are roughly equal. In another example, for asymmetric DL/UL configurations, the time split between DL and UL grants may be such that the ratio of DL PDCCH capacity and UL PDCCH capacity reflects the asymmetric DL/UL configurations. The detailed time split may also depend on the Cyclic Prefix (CP) type (e.g., normal and/or extended CP). When time split between DL and UL grants is not at the slot boundary, it is preferred that the PRB pair used for R-PDCCH is always the same PRB over the two slots (i.e., no slot-hopping). Alternatively, the set of PRB pairs for all R-PDCCH are preferably the same set of PRBs over the two slots. Otherwise, it is difficult to multiplex R-PDCCH with R-PDSCH in frequency domain in the same subframe. For DM-RS based R-PDCCH demodulation, it is natural that slot-hopping is disabled for R-PDCCH.

In accordance with aspects of the disclosure, a similar philosophy may be extended to the links between a network node (e.g., an eNB, a relay node, etc.), and UEs as well, where R-PDCCH may be utilized to serve additional UEs. For example, these UEs may be part of new LTE releases and may be configured to utilize R-PDCCH for communicating with the network, instead of PDCCH in the legacy control region as specified in LTE Rel-8.

In accordance with aspects of the disclosure, UL grant may be both in first and second 'segment'. Reuse search space in the first segment for UL R-PDCCH grants may be achieved at least for a size match between DL/UL grants. Avoid search space spanning both segments for UL R-PDCCH if that increases number of blind decodes. This may impact the optimization of the time split as well.

In accordance with aspects of the disclosure, optimizing a time split between DL and UL grants may be based on the following parameters:
  denote s1 as a starting symbol index of R-PDCCH;
  denote s2 as an ending symbol index of R-PDCCH;
  denote s3 as a largest possible symbol index for early decoding; and
  denote s4 as an ending symbol index of DL R-PDCCH,
    wherein a time span of DL R-PDCCH is:
    s1 to s4—a total of (s4-s1+1) symbols, and
    wherein a time span of UL R-PDCCH is:
    s4+1 to s2—a total of (s2-s4) symbols.

In an implementation, for a symmetric configuration, s4 may be derived to equalize DL/UL R-PDCCH capacity subject to potential R-PDCCH early decoding requirements. A first parameter is computed:

$$(s4-s1+1)=(s2-s4), \text{ or } s4=(s1+s2-1)/2.$$

Then, considering an early decoding constraint, a second parameter is computed:

$$s4=\min((s1+s2-1)/2, s3).$$

When (s1+s2-1)/2 is not an integer, round(.), floor(.) or ceiling(.) operation may be applied.

In another implementation, for asymmetric configuration, s4 may be derived by denote r as a ratio between DL and UL subframes.

For example, r=1 (symmetric), 2 (DL heavy), 0.5 (UL heavy), etc.

To equalize DL/UL R-PDCCH capacity subject to DL/UL asymmetry and potential R-PDCCH early decoding requirements. A first parameter is computed:

$$(s4-s1+1)/(s2-s4)=r, \text{ or } s4=(r*s2+s1-1)/(1+r).$$

Considering the early decoding constraint, a second parameter is computed:

$$s4=\min((r*s2+s1-1)/(1+r), s3).$$

When (r*s2+s1-1)/(1+r) is not an integer, round(.), floor(.) or ceiling(.) operation may be applied.

Referring to FIG. 8C, diagram 840 illustrates one example of an optimized time split between DL and UL R-PDCCH grants, wherein as shown, DL grants have a symbol span from s1 to s4 and UL grants have a symbol span from s4+1 to s2. It should be appreciated that the time split between DL and UL R-PDCCH grants may be either hard-coded (e.g., by some formula as shown above) or Layer 3 (L3) configured. In an example, dynamic signaling may not be necessary.

In accordance with aspects of the disclosure, multiplexing R-PDCCH is described herein. Static split of DL grants and UL grants at a slot boundary results in uneven DL R-PDCCH capacity and UL R-PDCCH capacity. This is not desirable if symmetric DL and UL backhaul subframes are configured. For instance, when the R-PDCCH starts at the fourth symbol and ends at the last symbol, the capacity of DL grants and UL grants is roughly 4:7 for the normal CP case when a static split between DL and UL grants at the slot boundary is applied. To provide comparable R-PDCCH capacity for DL and UL, the boundary for the static split may be adjusted based on the R-PDCCH starting symbol, the R-PDCCH ending symbol, and various other factors (e.g., early decoding constraint). For instance, in the same example of when R-PDCCH starts at the 4$^{th}$ symbol and ends at the 13$^{th}$ symbol, the boundary may be chosen to be the 9$^{th}$ symbol, resulting in a ratio of 6:5.

When asymmetric DL and UL backhaul subframes are configured, the boundary may be adjusted by considering the ratio in DL and UL subframes. As such, the boundary may be such that the ratio of DL and UL R-PDCCH capacity is consistent with the ratio of DL and UL subframes available for relay backhaul operation.

When the boundary of the static split is not aligned with the slot boundary, the PRB pairs of R-PDCCH may come from the same PRB over the two slots (e.g., no hopping). This facilitates multiplexing of R-PDCCH and (R)-PDSCH in one subframe.

When CRS is used for R-PDCCH demodulation, the DL grant and UL grant in a PRB pair may be for the same or different RNs. As such, existing R-PDCCH design philosophies may be readily applied. In particular, an existing REG concept may be used, which may be further used to construct CCE. Note that, the CCE size may not be fixed at 36 (e.g., as in LTE Rel-8). The CCE size may be configured to be as close to 36 as possible.

When DM-RS is used for R-PDCCH demodulation, the DL grant and UL grant in a PRB pair may be for the same RN. In this case, it is no longer necessary to introduce the REG concept. Instead, the entire half slot may be defined as the minimum unit for construction of R-PDCCH.

In accordance with aspects of the disclosure, a boundary between the split of DL R-PDCCH grants and UL R-PDCCH grants may be adjusted for DL R-PDCCH capacity and UL R-PDCCH capacity. In an example, DL R-PDCCH grants and UL R-PDCCH grants may be adjusted for balanced DL and UL R-PDCCH capacity. In another example, DL R-PDCCH grants and UL R-PDCCH grants may be adjusted for increased DL R-PDCCH capacity. In still another example, DL R-PDCCH grants and UL R-PDCCH grants may be adjusted for increased UL R-PDCCH capacity.

Figure 9:
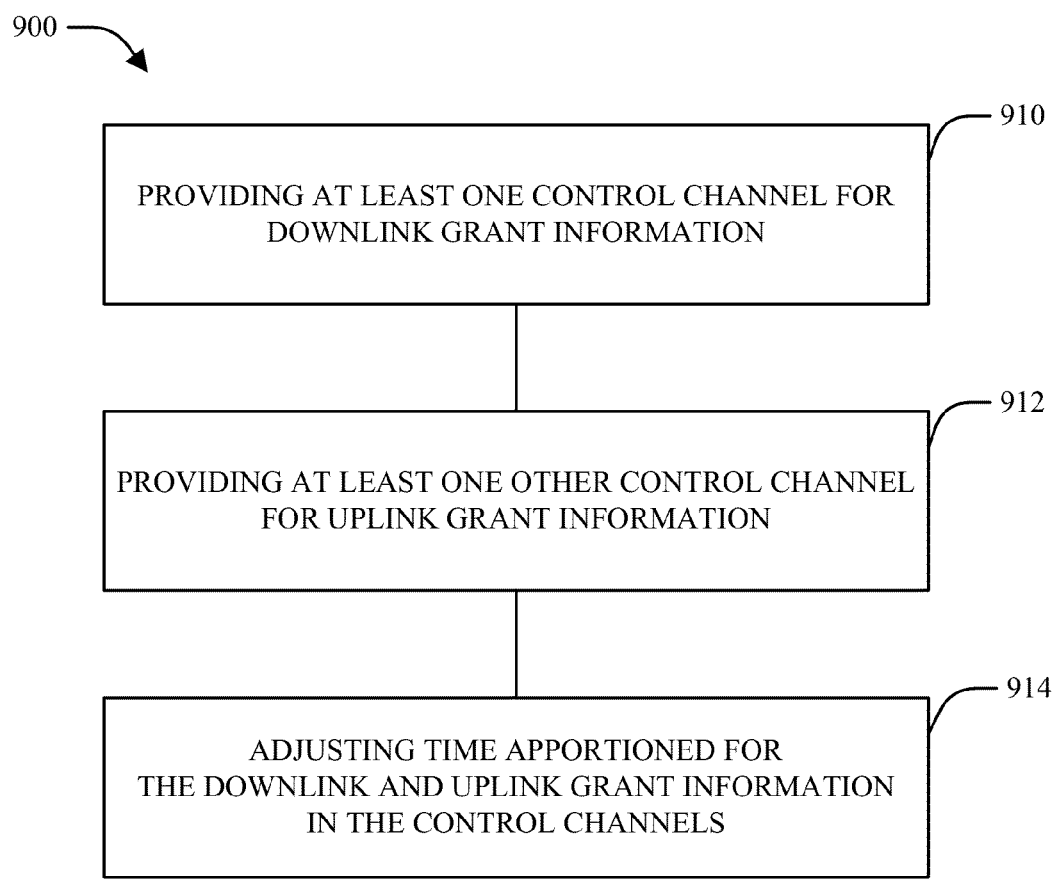
FIG. 9 is a flow diagram of a methodology that facilitates optimized time splitting between DL and UL grants associated with one or more control channels in a wireless communication environment, in accordance with aspects of the disclosure.

FIG. 9 illustrates a flow diagram 900 for a method of optimizing time splitting between downlink (DL) and uplink (UL) grants associated with one or more control channels in a wireless communication environment, in accordance with aspects of the disclosure. At 910, the method is configured for providing at least one control channel for DL grant information. At 912, the method is configured for providing at least one other control channel for UL grant information. In an implementation, the method provides a first control channel for DL grant information and a second control channel for UL grant information. At 914, the method is configured for adjusting time apportioned for the DL and UL grant information in the control channels.

In an implementation, the control channels may be associated with a relay backhaul. The control channels may comprise downlink control channels, such as, for example, R-PDCCHs.

In an implementation, the control channels may be transmitted in one or more symbols of a subframe. The DL grant information may be transmitted in a first portion of a subframe, and the UL grant information may be transmitted in a second portion of the subframe.

In an implementation, adjusting time apportioned for the DL and UL grant information in the control channels may comprise increasing time apportioned for DL grant information. In another implementation, adjusting time apportioned for the DL and UL grant information in the control channels may comprise apportioning substantially equal time for the DL and UL grant information. In another implementation, referring to FIG. 8C, adjusting time apportioned for the DL and UL grant information in the control channels may be disparate from the slot boundary associated with the control channels. In another implementation, adjusting time apportioned for the DL and UL grant information in the control channels may be based on an early decoding tolerance associated with the control channel. In another implementation, adjusting time apportioned for the DL and UL grant information in the control channels may be based on a subframe configuration. In another implementation, adjusting time apportioned for the DL and UL grant information in the control channel may be based on a cyclic prefix (CP) type.

Figure 10:
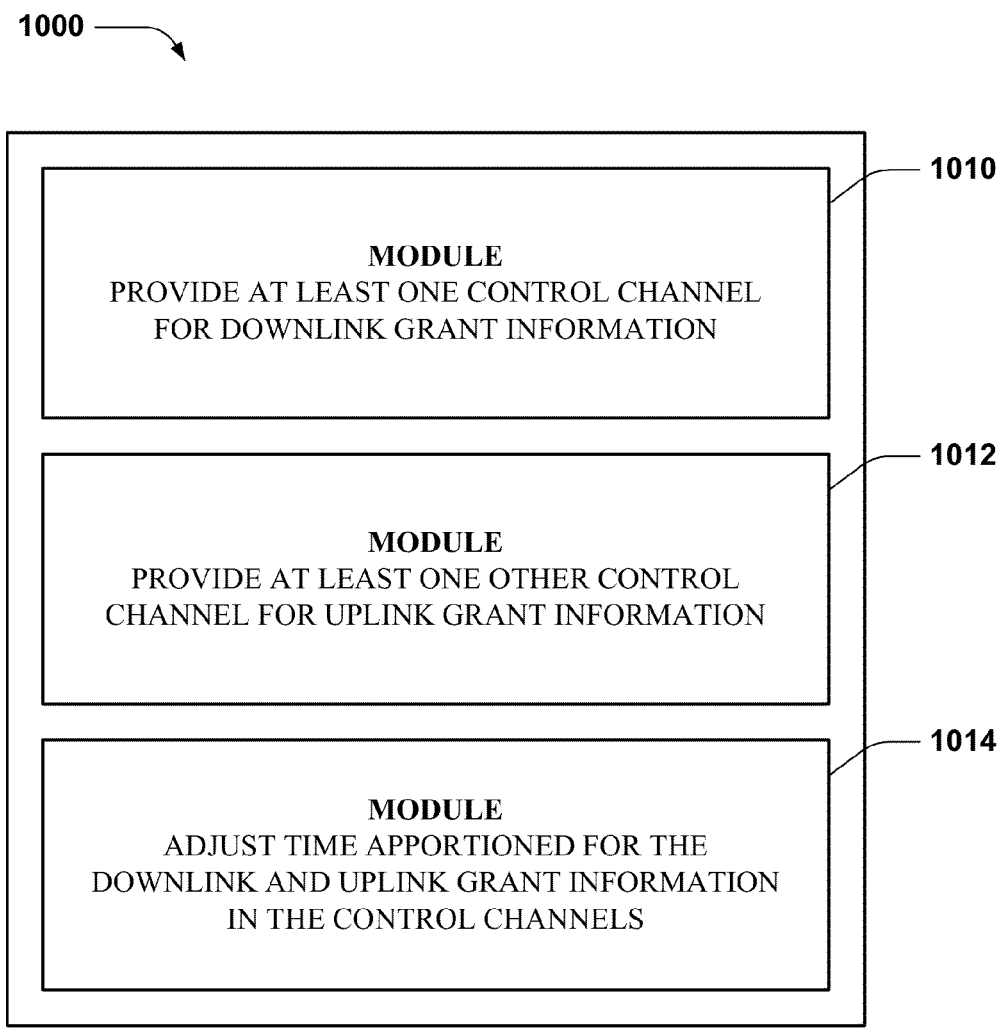
FIG. 10 is conceptual block diagram illustrating functionality of an apparatus, in accordance with aspects of the disclosure.

FIG. 10 is a conceptual block diagram 1000 illustrating functionality of an apparatus 100 configured to facilitate optimized time splitting between DL and UL grants associated with one or more control channels in a wireless communication environment, in accordance with aspects of the disclosure. The apparatus 100 includes a module 1010 configured to provide at least one control channel for DL grant information.

The apparatus 100 includes a module 1012 configured to provide at least one other control channel for UL grant information. In an implementation, the module 1010 provides a first control channel for DL grant information, and the module 1012 provides a second control channel for UL grant information. The apparatus 100 includes a module 1014 configured to adjust time apportioned for the DL and UL grant information in the control channels. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in a configuration, the apparatus 100 for wireless communication comprises the processing system 114 configured to provide a means for providing at least one control channel for downlink (DL) grant information, a means for providing at least one other control channel for uplink (UL) grant information, and a means for adjusting time apportioned for the DL and UL grant information in the control channels.

Figure 11:
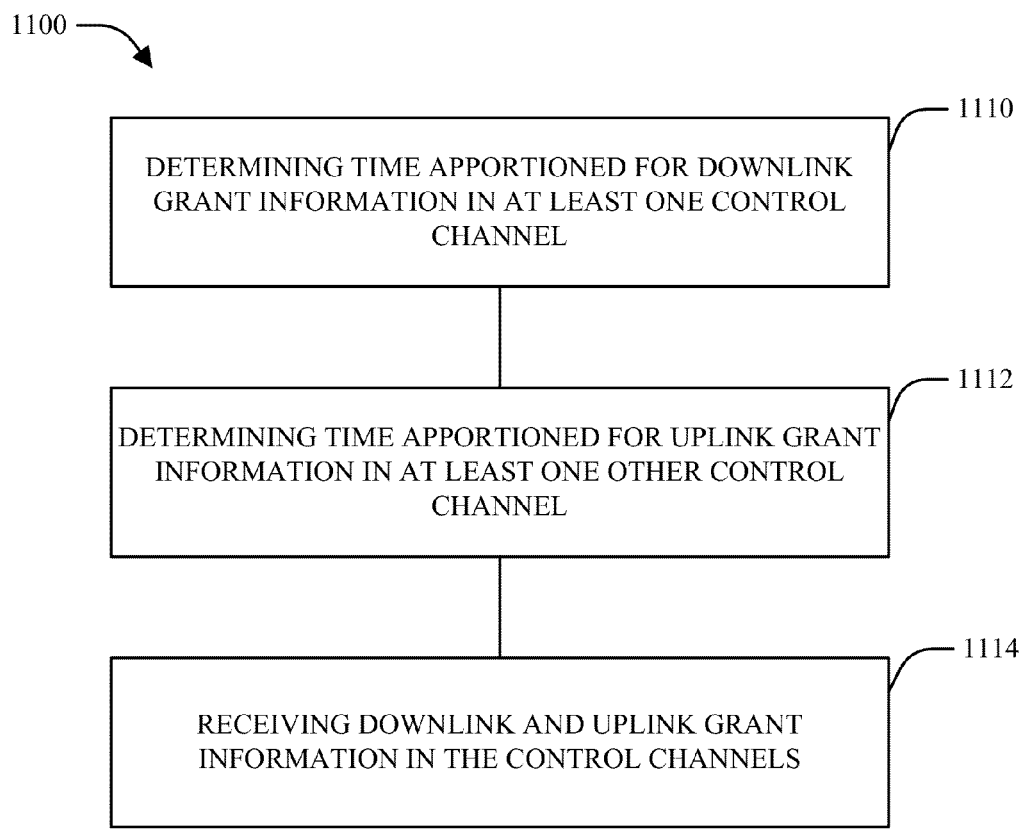
FIG. 11 is a flow diagram of a methodology that facilitates optimized time splitting between DL and UL grants associated with one or more control channels in a wireless communication environment, in accordance with aspects of the disclosure.

FIG. 11 illustrates a flow diagram 1100 for a method of optimizing time splitting between downlink (DL) and uplink (UL) grants associated with one or more control channels in a wireless communication environment, in accordance with aspects of the disclosure. At 1110, the method is configured for determining time apportioned for DL grant information in at least one control channel. At 1112, the method is configured for determining time apportioned for UL grant information in at least one other control channel. In an implementation, the method determines time apportioned for DL grant information in a first control channel and determines time apportioned for UL grant information in a second control channel. At 1114, the method is configured for receiving DL and UL grant information in the control channels.

In an implementation, the control channels may be associated with a relay backhaul. The control channels may comprise downlink control channels, such as, for example, R-PDCCHs.

In an implementation, the control channels may be received in one or more symbols of a subframe. The DL grant information may be received in a first portion of a subframe, and the UL grant information may be received in a second portion of the subframe.

In an implementation, the time apportioned for the DL grant information may be at least greater than the time apportioned for the UL grant information. In another implementation, the time apportioned for the DL grant information may be substantially equal to the time apportioned for the UL grant information. In another implementation, determining time apportioned for the DL and UL grant information in the control channels may be based on a starting symbol and an ending symbol associated with the control channels. In another implementation, determining time apportioned for the DL and UL grant information in the control channels may be based on a subframe configuration. In another implementation, determining time apportioned for the DL and UL grant information in the control channels may be based on a cyclic prefix (CP) type.

Figure 12:
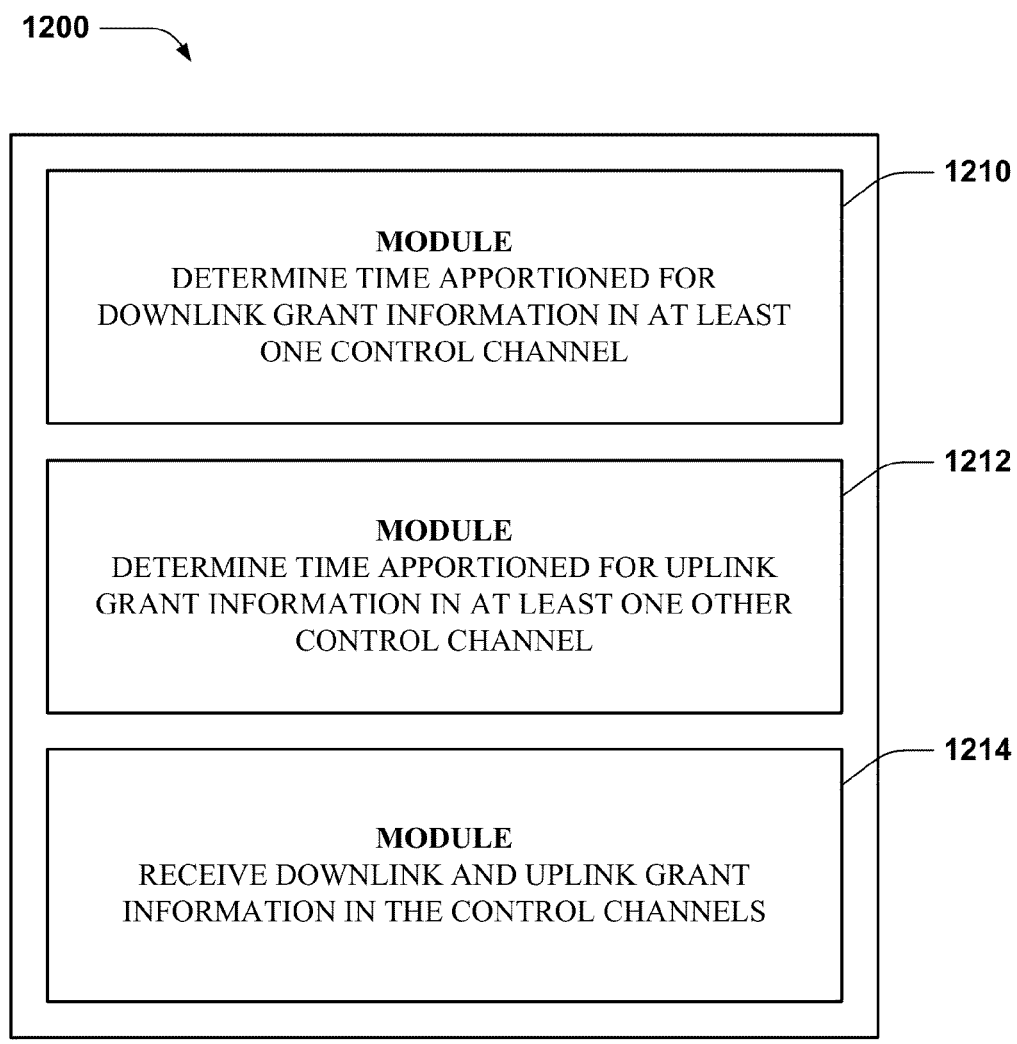
FIG. 12 is conceptual block diagram illustrating functionality of an apparatus, in accordance with aspects of the disclosure.

FIG. 12 is a conceptual block diagram 1200 illustrating functionality of an apparatus 100 configured to facilitate optimized time splitting between DL and UL grants associated with one or more control channels in a wireless communication environment, in accordance with aspects of the disclosure. The apparatus 100 includes a module 1210 configured to determine time apportioned for DL grant information in at least one control channel. The apparatus 100 includes a module 1212 configured to determine time apportioned for UL grant information in at least one other control channel. In an implementation, the module 1210 determines time apportioned for DL grant information in a first control channel, and the module 1212 determines time apportioned for UL grant information in a second control channel. The apparatus 100 includes a module 1214 configured to receive DL and UL grant information in the control channels. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in a configuration, the apparatus 100 for wireless communication comprises the processing system 114 configured to provide a means for determining time apportioned for downlink (DL) grant information in at least one control channel, a means for determining time apportioned for uplink (UL) grant information in at least one other control channel, and a means for receiving DL and UL grant information in the control channels.

It will be appreciated that, in accordance with one or more aspects described herein, inferences may be made regarding or for performing the functions described herein. As utilized herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented utilizing any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method for wireless communication, comprising:
providing at least one control channel for downlink grant information;
providing at least one other control channel for uplink grant information; and
adjusting time apportioned for the downlink and uplink grant information in the control channels, wherein an ending symbol index of the at least one control channel for downlink grant information is a lower of a largest possible symbol index for early decoding and a ratio based on downlink and uplink frames.

2. The method of claim 1, wherein the control channels are associated with the relay backhaul.

3. The method of claim 1, wherein the control channels comprise downlink control channels.

4. The method of claim 1, wherein the control channels are transmitted in one or more symbols of a subframe.

5. The method of claim 1, wherein:
the downlink grant information is transmitted in a first portion of a subframe, and
the uplink grant information is transmitted in a second portion of the subframe.

6. The method of claim 1, wherein the adjusting time apportioned for the downlink and uplink grant information in the control channels comprises increasing time apportioned for the downlink grant information.

7. The method of claim 1, wherein the adjusting time apportioned for the downlink and uplink grant information in the control channels is based on a starting symbol and an ending symbol associated with the control channels.

8. The method of claim 1, wherein the adjusting time apportioned for the downlink and uplink grant information in the control channels is based on an early decoding tolerance associated with the control channels.

9. The method of claim 1, wherein the adjusting time apportioned for the downlink and uplink grant information in the control channels is based on a cyclic prefix type.

10. The method of claim 1, wherein the adjusting time apportioned for the downlink and uplink grant information in the control channels is disparate from a slot boundary associated with the control channels.

11. The method of claim 1, wherein the adjusting time apportioned for the downlink and uplink grant information in the control channels comprises apportioning substantially equal time for the downlink and uplink grant information.

12. An apparatus, comprising:
a processing system configured to:
provide at least one control channel for downlink grant information;
provide at least one other control channel for uplink grant information; and
adjust time apportioned for the downlink and uplink grant information in the control channels, wherein an ending symbol index of the at least one control channel for downlink grant information is a lower of a largest possible symbol index for early decoding and a ratio based on downlink and uplink frames.

13. The apparatus of claim 12, wherein the control channels are associated with the relay backhaul.

14. The apparatus of claim 12, wherein the control channels comprise downlink control channels.

15. The apparatus of claim 12, wherein the control channels are transmitted in one or more symbols of a subframe.

16. The apparatus of claim 12, wherein:
the downlink grant information is transmitted in a first portion of a subframe, and
the uplink grant information is transmitted in a second portion of the subframe.

17. The apparatus of claim 12, wherein the adjusting time apportioned for the downlink and uplink grant information in the control channels comprises increasing time apportioned for the downlink grant information.

18. The apparatus of claim 12, wherein the adjusting time apportioned for the downlink and uplink grant information in the control channels is based on a starting symbol and an ending symbol associated with the control channels.

19. The apparatus of claim 12, wherein the adjusting time apportioned for the downlink and uplink grant information in the control channels is based on an early decoding tolerance associated with the control channels.

20. The apparatus of claim 12, wherein the adjusting time apportioned for the downlink and uplink grant information in the control channels is based on a cyclic prefix type.

21. The apparatus of claim 12, wherein the adjusting time apportioned for the downlink and uplink grant information in the control channels is disparate from a slot boundary associated with the control channels.

22. The apparatus of claim 12, wherein the adjusting time apportioned for the downlink and uplink grant information in the control channels comprises apportioning substantially equal time for the downlink and uplink grant information.

23. An apparatus, comprising:
means for providing at least one control channel for downlink grant information;
means for providing at least one other control channel for uplink grant information; and
means for adjusting time apportioned for the downlink and uplink grant information in the control channels, wherein an ending symbol index of the at least one control channel for downlink grant information is a lower of a largest possible symbol index for early decoding and a ratio based on downlink and uplink frames.

24. The apparatus of claim 23, wherein the control channels are associated with the relay backhaul.

25. The apparatus of claim 23, wherein the control channels comprise downlink control channels.

26. The apparatus of claim 23, wherein the control channels are transmitted in one or more symbols of a subframe.

27. The apparatus of claim 23, wherein:
the downlink grant information is transmitted in a first portion of a subframe, and
the uplink grant information is transmitted in a second portion of the subframe.

28. The apparatus of claim 23, wherein the means for adjusting time apportioned for the downlink and uplink grant information in the control channels comprises means for increasing time apportioned for the downlink grant information.

29. The apparatus of claim 23, wherein the means for adjusting time apportioned for the downlink and uplink grant information in the control channels comprises means for adjusting time based on a starting symbol and an ending symbol associated with the control channels.

30. The apparatus of claim 23, wherein the means for adjusting time apportioned for the downlink and uplink grant information in the control channels comprises means for adjusting time based on an early decoding tolerance associated with the control channels.

31. The apparatus of claim 23, wherein the means for adjusting time apportioned for the downlink and uplink grant information in the control channels comprises means for adjusting time based on a cyclic prefix type.

32. The apparatus of claim 23, wherein the means for adjusting time apportioned for the downlink and uplink grant information in the control channels comprises means for adjusting time disparate from a slot boundary associated with the control channels.

33. The apparatus of claim 23, wherein the means for adjusting time apportioned for the downlink and uplink grant information in the control channels comprises means for apportioning substantially equal time for the downlink and uplink grant information.

34. A computer program product, comprising:
a non-transitory computer-readable medium comprising codes executable to cause an apparatus to:
provide at least one control channel for downlink grant information;
provide at least one other control channel for uplink grant information; and
adjust time apportioned for the downlink and uplink grant information in the control channels, wherein an ending symbol index of the at least one control channel for downlink grant information is a lower of a largest possible symbol index for early decoding and a ratio based on downlink and uplink frames.

35. The computer program product of claim 34, wherein the control channels are associated with the relay backhaul.

36. The computer program product of claim 34, wherein the control channels comprise downlink control channels.

37. The computer program product of claim 34, wherein the control channels are transmitted in one or more symbols of a subframe.

38. The computer program product of claim 34, wherein:
the downlink grant information is transmitted in a first portion of a subframe, and
the uplink grant information is transmitted in a second portion of the subframe.

39. The computer program product of claim 34, wherein the adjusting time apportioned for the downlink and uplink grant information in the control channels comprises increasing time apportioned for the downlink grant information.

40. The computer program product of claim 34, wherein the adjusting time apportioned for the downlink and uplink grant information in the control channels is based on a starting symbol and an ending symbol associated with the control channels.

41. The computer program product of claim 34, wherein the adjusting time apportioned for the downlink and uplink grant information in the control channels is based on an early decoding tolerance associated with the control channels.

42. The computer program product of claim 34, wherein the adjusting time apportioned for the downlink and uplink grant information in the control channels is based on a cyclic prefix type.

43. The computer program product of claim 34, wherein the adjusting time apportioned for the downlink and uplink grant information in the control channels is disparate from a slot boundary associated with the control channels.

44. The computer program product of claim 34, wherein the adjusting time apportioned for the downlink and uplink grant information in the control channels comprises apportioning substantially equal time for the downlink and uplink grant information.

45. A method for wireless communication, comprising:
determining time apportioned for downlink grant information in at least one control channel;
determining time apportioned for uplink grant information in at least one other control channel; and
receiving downlink and uplink grant information in the control channels,
wherein an ending symbol index of the at least one control channel for downlink grant information is a lower of a largest possible symbol index for early decoding and a ratio based on downlink and uplink frames.

46. The method of claim 45, wherein the control channels are associated with the relay backhaul.

47. The method of claim 45, wherein the control channels comprise downlink control channels.

48. The method of claim 45, wherein the control channels are received in one or more symbols of a subframe.

49. The method of claim 45, wherein:
the downlink grant information is received in a first portion of a subframe, and
the uplink grant information is received in a second portion of the subframe.

50. The method of claim 45, wherein the time apportioned for the downlink grant information is at least greater than the time apportioned for the uplink grant information.

51. The method of claim 45, wherein the determining time apportioned for the downlink and uplink grant information in the control channels is based on a starting symbol and an ending symbol associated with the control channels.

52. The method of claim 45, wherein the determining time apportioned for the downlink and uplink grant information in the control channels is based on a cyclic prefix type.

53. The method of claim 45, wherein the time apportioned for the downlink grant information is substantially equal to the time apportioned for the uplink grant information.

54. An apparatus, comprising:
a processing system configured to:
determine time apportioned for downlink grant information in at least one control channel;
determine time apportioned for uplink grant information in at least one other control channel; and
receive downlink and uplink grant information in the control channels,
wherein an ending symbol index of the at least one control channel for downlink grant information is a lower of a largest possible symbol index for early decoding and a ratio based on downlink and uplink frames.

55. The apparatus of claim 54, wherein the control channels are associated with the relay backhaul.

56. The apparatus of claim 54, wherein the control channels comprise downlink control channels.

57. The apparatus of claim 54, wherein the control channels are received in one or more symbols of a subframe.

58. The apparatus of claim 54, wherein:
the downlink grant information is received in a first portion of a subframe, and
the uplink grant information is received in a second portion of the subframe.

59. The apparatus of claim 54, wherein the time apportioned for the downlink grant information is at least greater than the time apportioned for the uplink grant information.

60. The apparatus of claim 54, wherein the determining time apportioned for the downlink and uplink grant information in the control channels is based on a starting symbol and an ending symbol associated with the control channels.

61. The apparatus of claim 54, wherein the determining time apportioned for the downlink and uplink grant information in the control channels is based on a cyclic prefix type.

62. The apparatus of claim 54, wherein the time apportioned for the downlink grant information is substantially equal to the time apportioned for the uplink grant information.

63. An apparatus, comprising:
means for determining time apportioned for downlink grant information in at least one control channel;
means for determining time apportioned for uplink grant information in at least one other control channel; and
means for receiving downlink and uplink grant information in the control channels,
wherein an ending symbol index of the at least one control channel for downlink grant information is a lower of a largest possible symbol index for early decoding and a ratio based on downlink and uplink frames.

64. The apparatus of claim 63, wherein the control channels are associated with the relay backhaul.

65. The apparatus of claim 63, wherein the control channels comprise downlink control channels.

66. The apparatus of claim 63, wherein the control channels are received in one or more symbols of a subframe.

67. The apparatus of claim 63, wherein:
the downlink grant information is received in a first portion of a subframe, and
the uplink grant information is received in a second portion of the subframe.

68. The apparatus of claim 63, wherein the time apportioned for the downlink grant information is at least greater than the time apportioned for the uplink grant information.

69. The apparatus of claim 63, wherein the determining time apportioned for the downlink and uplink grant information in the control channels is based on a starting symbol and an ending symbol associated with the control channels.

70. The apparatus of claim 63, wherein the determining time apportioned for the downlink and uplink grant information in the control channels is based on a cyclic prefix type.

71. The apparatus of claim 63, wherein the time apportioned for the downlink grant information is substantially equal to the time apportioned for the uplink grant information.

72. A computer program product, comprising:
a non-transitory computer-readable medium comprising codes executable to cause an apparatus to:
determine time apportioned for downlink grant information in at least one control channel;
determine time apportioned for uplink grant information in at least one other control channel; and
receive downlink and uplink grant information in the control channels,
wherein an ending symbol index of the at least one control channel for downlink grant information is a lower of a largest possible symbol index for early decoding and a ratio based on downlink and uplink frames.

73. The computer program product of claim 72, wherein the control channels are associated with the relay backhaul.

74. The computer program product of claim 72, wherein the control channels comprise downlink control channels.

75. The computer program product of claim 72, wherein the control channels are received in one or more symbols of a subframe.

76. The computer program product of claim 72, wherein:
the downlink grant information is received in a first portion of a subframe, and
the uplink grant information is received in a second portion of the subframe.

77. The computer program product of claim 72, wherein the time apportioned for the downlink grant information is at least greater than the time apportioned for the uplink grant information.

78. The computer program product of claim 72, wherein the determining time apportioned for the downlink and uplink grant information in the control channels is based on a starting symbol and an ending symbol associated with the control channels.

79. The computer program product of claim 72, wherein the determining time apportioned for the downlink and uplink grant information in the control channels is based on a cyclic prefix type.

80. The computer program product of claim 72, wherein the time apportioned for the downlink grant information is substantially equal to the time apportioned for the uplink grant information.

* * * * *